United States Patent
Martin et al.

(10) Patent No.: US 11,513,483 B2
(45) Date of Patent: Nov. 29, 2022

(54) SYSTEMS AND METHODS FOR EMULATING A NETWORK DEVICE

(71) Applicant: ROCKWELL AUTOMATION TECHNOLOGIES, INC., Mayfield Heights, OH (US)

(72) Inventors: William Howell Martin, Franklin, WI (US); Jeffrey Scott Martin, Waukesha, WI (US); John Patrick Caspers, Racine, WI (US); Eric Allen Norrod, Franklin, NC (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 825 days.

(21) Appl. No.: 16/379,284

(22) Filed: Apr. 9, 2019

(65) Prior Publication Data

US 2020/0326675 A1    Oct. 15, 2020

(51) Int. Cl.
*G05B 17/02* (2006.01)
*H04L 67/12* (2022.01)
*H04L 67/60* (2022.01)

(52) U.S. Cl.
CPC ............ *G05B 17/02* (2013.01); *H04L 67/12* (2013.01); *H04L 67/60* (2022.05)

(58) Field of Classification Search
CPC .......... G05B 17/02; H04L 67/12; H04L 67/32
USPC .................................................. 700/159–195
See application file for complete search history.

(56) References Cited

U.S. PATENT DOCUMENTS

| | | | |
|---|---|---|---|
| 6,529,909 B1 * | 3/2003 | Bowman-Amuah | G06F 16/258 |
| 6,868,375 B1 | 3/2005 | Margulieux | |
| 8,108,200 B2 | 1/2012 | Anne et al. | |
| 8,229,576 B2 | 7/2012 | Kodama et al. | |
| 8,589,140 B1 * | 11/2013 | Poulin | G06F 8/30 703/22 |
| 8,869,157 B2 * | 10/2014 | Raney | G06F 9/5044 718/102 |
| 8,966,027 B1 * | 2/2015 | Brandwine | G06F 9/45533 709/221 |
| 9,391,797 B2 | 7/2016 | Naismith et al. | |
| 9,491,242 B2 | 11/2016 | Bomkamp et al. | |
| 9,794,347 B2 | 10/2017 | Bomkamp et al. | |
| 10,042,335 B2 | 8/2018 | Grgic | |
| 10,733,116 B2 * | 8/2020 | Litichever | G06F 13/4282 |

(Continued)

OTHER PUBLICATIONS

Tedesco, Michael-Anthony, and M. Reza Emami. "A modular and turn-key remote-access hardware-in-the-loop platform for testing electric motors." Journal of Advanced Mechanical Design, Systems, and Manufacturing 8.1 (2014): pp. 1-15 (Year: 2014).*

(Continued)

*Primary Examiner* — Satish Rampuria
(74) *Attorney, Agent, or Firm* — Quarles & Brady LLP

(57) ABSTRACT

A method of motor control device emulation includes receiving, via a network-enabled motor control device, a communication request corresponding to an emulated motor control device. The method further includes modifying the communication request to match an expected communication request. Additionally, the method includes providing a modified communication request to an associated hardware module within the network-enabled motor control device. Further, the expected communication request is based on the network-enabled motor control device.

20 Claims, 13 Drawing Sheets

(56) References Cited

U.S. PATENT DOCUMENTS

| | | | | |
|---|---|---|---|---|
| 2009/0292524 A1* | 11/2009 | Anne | ............... | G06F 9/451 |
| | | | | 703/25 |
| 2012/0054828 A1* | 3/2012 | Jiang | ............... | H04L 67/02 |
| | | | | 726/3 |
| 2012/0210315 A1 | 8/2012 | Kapadekar et al. | | |
| 2018/0308296 A1* | 10/2018 | Dan | ............... | B62D 15/021 |

OTHER PUBLICATIONS

Grush, Rick. "The emulation theory of representation: Motor control, imagery, and perception." Behavioral and brain sciences 27.3 (2004): pp. 377-396. (Year: 2004).*

Tedesco, Michael-Anthony Clarke. Design and Development of a Modular Platform for Remotely Testing DC Motors via the Internet. Diss. 2010.pp. 1-99 (Year: 2010).*

Pham, Cuong, et al. "Cloudval: A framework for validation of virtualization environment in cloud infrastructure." 2011 IEEE/IFIP 41st International Conference on Dependable Systems & Networks (DSN). IEEE, 2011.pp. 189-196. (Year: 2011).*

Hetzelt, Felicitas, and Robert Buhren. "Security analysis of encrypted virtual machines." ACM SIGPLAN Notices 52.7 (2017): pp. 129-142. (Year: 2017).*

Hu, Wei, et al. "An overview of hardware security and trust: Threats, countermeasures, and design tools." IEEE Transactions on Computer-Aided Design of Integrated Circuits and Systems 40.6 (2020): pp. 1010-1038. (Year: 2020).*

* cited by examiner

SYSTEMS AND METHODS FOR EMULATING A NETWORK DEVICE

BACKGROUND OF THE INVENTION

The subject matter disclosed herein generally relates to the replacement of network-enabled devices and, more particularly, to the emulation of legacy network-enabled motor control devices.

BRIEF DESCRIPTION OF THE DISCLOSURE

One embodiment of the present disclosure is a network-enabled motor control system, including a user interface to accept user inputs, and a network-enabled device. The network-enabled device includes a control module having a memory, and a communication module in electrical communication with the control module and the user interface. The memory stores processing instructions, and the processing instructions, when executed by the control module, cause the control module to receive, via the communication module, a user input corresponding to an emulation mode selection. The processing instructions further cause the control module to receive, via the communication module, a communication request corresponding to an emulated device. Additionally, the processing instructions cause the control module to modify the communication request to match an expected communication request. Further, the processing instructions cause the control module to provide a modified communication request to an associated hardware module within the control module. Additionally, the expected communication request is based on a network-enabled device type.

A further embodiment of the present disclosure is a network-enabled electronic overload system including a control module, a sensing module, and a communication module. The control module includes a memory and is configured to provide a control voltage to a motor starter. The sensing module is configured to measure operational data corresponding to the motor starter. The communication module is in electrical communication with the control module and configured to communicate via a network. The memory is configured to store processing instructions, and the processing instructions, when executed by the control module, cause the control module to receive, via the communication module, a communication request. The processing instructions further cause the control module to determine that the communication request corresponds to an emulated device. Further; in response to the determination that the communication request corresponds to the emulated device, the processing instructions further cause the control module to modify the communication request to match an expected communication request. Additionally, the processing instructions cause the control module to provide a modified communication request to an associated hardware module within the network-enabled electronic overload system.

A further embodiment of the present disclosure is a method of motor control device emulation. The method includes receiving, via a network-enabled motor control device, a communication request corresponding to an emulated motor control device. The method further includes modifying the communication request to match an expected communication request. Additionally, the method includes providing a modified communication request to an associated hardware module within the network-enabled motor control device. Further, the expected communication request is based on the network-enabled motor control device.

To the accomplishment of the foregoing and related ends, the embodiments, then, comprise the features hereinafter fully described. The following description and the annexed drawings set forth in detail certain illustrative embodiments of the present disclosure. However, these embodiments are indicative of but a few of the various ways in which the principles of the disclosure can be employed. Other embodiments and features will become apparent from the following detailed description of the present disclosure when considered in conjunction with the drawings.

BRIEF DESCRIPTION OF THE DRAWINGS

The embodiments will hereafter be described with reference to the accompanying drawings, wherein like reference numerals denote like elements, and.

DETAILED DESCRIPTION OF THE DISCLOSURE

Figure 1:
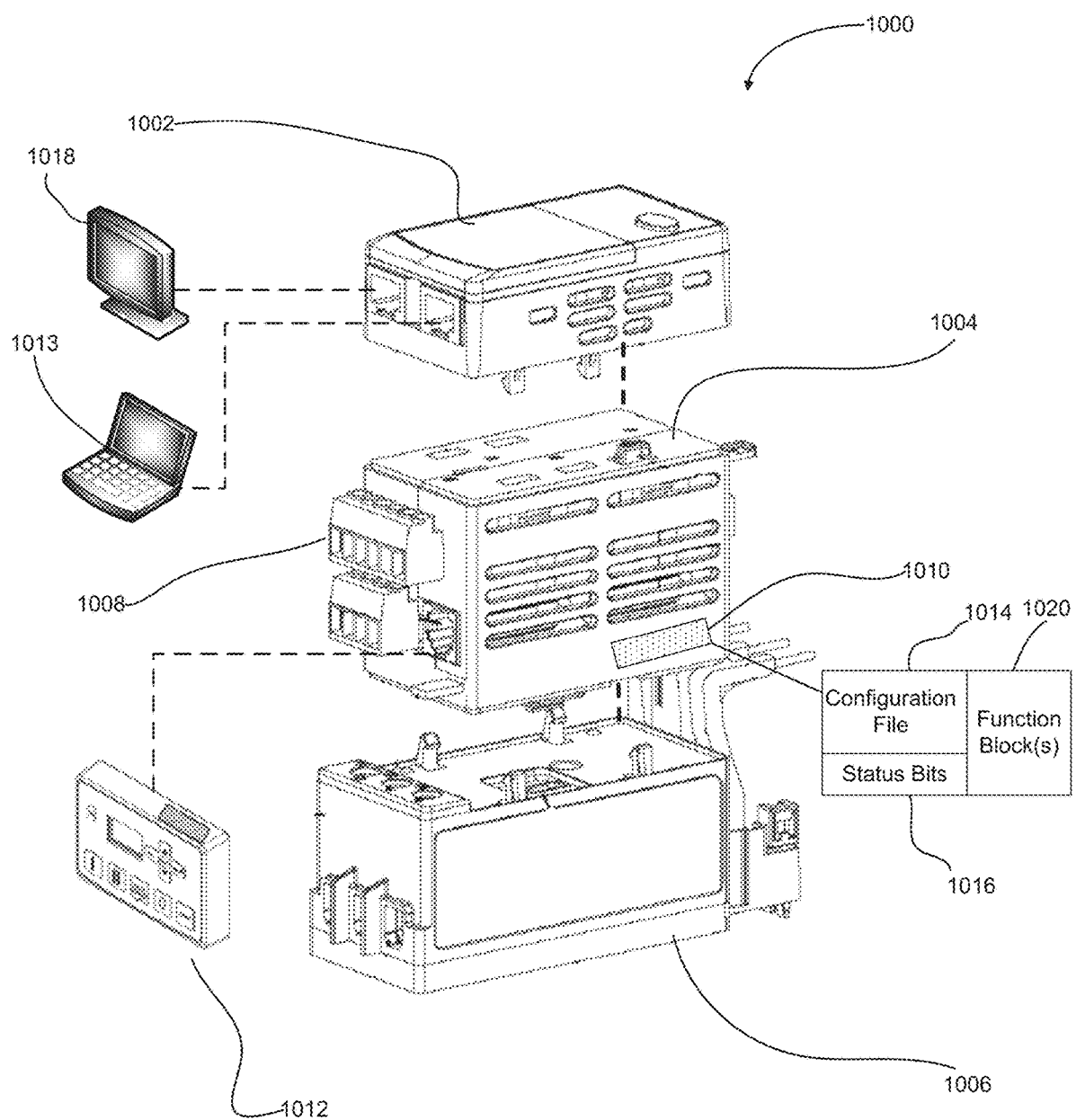
FIG. 1 is a perspective exploded view of a network-enabled device; according to embodiments of the present disclosure.

The following discussion is presented to enable a person skilled in the art to make and use embodiments of the present disclosure. Various modifications to the illustrated embodiments will be readily apparent to those skilled in the art, and the high-level principles herein can be applied to other embodiments and applications without departing from embodiments of the present disclosure. Thus, embodiments of the present disclosure are not intended to be limited to embodiments shown, but are to be accorded the widest scope consistent with the principles and features disclosed herein.

The detailed description is to be read with reference to the figures. The figures depict selected embodiments and are not intended to limit the scope of embodiments of the present disclosure. Skilled artisans will recognize the examples provided herein have many useful alternatives and fall within the scope of embodiments of the present disclosure. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. As used herein, unless expressly stated otherwise, "connected" means that one element/feature is directly or indirectly connected to another element/feature, and not necessarily electrically or mechanically. Likewise, unless expressly stated otherwise, "coupled" means that one element/feature is directly or indirectly coupled to another element/feature, and not necessarily electrically or mechanically.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment may employ various integrated circuit components, e.g., digital signal processing elements, logic elements, diodes, etc., which may carry out a variety of functions under the control of one or more processors or other control devices. Other embodiments may employ program code, or code in combination with other circuit components.

As described above, the subject matter disclosed herein generally relates to the replacement of network-enabled devices (e.g., intelligent devices) and, more particularly, to the emulation of legacy network-enabled motor control devices. In some embodiments, emulation of legacy network-enabled devices can provide easier commissioning and reduced replacement time. As used herein, the term "legacy" generally refers to a technology (e.g., system, device, application, method) which may be considered outdated and/or obsolete. In some instances, components associated with a legacy device may no longer be available from the manufacturer. Similarly, support services for a legacy device may be discontinued or limited.

One difficulty associated with motor control panels, in general, is the complexity associated with commissioning a motor control panel where multiple motor control circuits are implemented. As one non-limiting example, after each of the motor starters are mounted and wired, a system integrator is used to configure each intelligent electronic overload device. As motor control devices have become more sophisticated, the level of complexity involved in configuring each intelligent electronic overload device to match up to an associated motor system has become quite challenging. In some embodiments, a system integrator can be used to configure a local human-machine interface device (hereinafter "HMI"), and/or a network device to properly configure an intelligent electronic overload device. To perform the needed configuration, the system integrator may use a personal computer. Due to the complexity associated with configuring multiple parameters, configuration of a single intelligent electronic overload device task can take hours. Furthermore, after the intelligent electronic overload device itself is properly configured, the system integrator may then need to establish communications between the intelligent electronic overload device and a networked system such as an automation control system. This additional communication setup can result in even more time expended to fully configure the intelligent electronic overload device. Finally, due to the different types of communication networks available in the market, each deployment may need additional configuration and/or special wiring, thus further increasing the amount of time required to commission a motor control system and/or the potential for human error.

Another difficulty associated with network-enabled motor control devices is the time required to configure a replacement network-enabled motor control device. Currently, maintenance personnel often require access to a computer in order to configure a replacement device. Oftentimes, they may not have immediate access to the computer when needed. Lack of access to a properly configured computer, combined with the above mentioned difficulty associated with configuring complex network-enabled motor control devices, can result in unnecessary downtime as well as lost production time when a network-enabled motor control device must be replaced.

Customers often have a difficult time when a legacy networked-enabled motor control device needs to be replaced. As used herein, the term "legacy" generally refers to a technology (e.g., system, device, application, method) which may be considered outdated and/or obsolete. In some instances, the legacy device breaks down or wears out. In other instances, replacement can be desired as part of a system upgrade. Often, the older network-enabled motor control device has been obsoleted by its manufacturer in which the manufacturer has run out of inventory of the older networked enabled motor control device, and the manufacturer no longer produces the older network enabled motor control device. These legacy devices must then be replaced with a newer control device.

Customers attempting to replace a legacy device will often use a different networked enabled motor control device. However, oftentimes the replacement device has a different physical size, the electrical connections are different, the new device operates differently, and/or the interface to a programmable logic controller (or other network controller) must be rewritten.

Another general difficulty associated with network-enabled motor control devices is the large number of catalog numbers that need to be manufactured and warehoused. Typically, a device is designed for only a limited use (e.g., current, voltage, function). Manufacturers often want to offer a full product line, which means offering a large variety of devices. Thus, an integrator or an original equipment manufacturer ("OEM") using overload relays (as one non-limiting example) needs to have a large selection of overload relays available to meet the needs of the designed application. Attempts to accommodate overload relays to operate in a wider range of applications can result in increased size, cost, and heat generation. Similarly, intelligent electronic overload devices with many available options have multiple product configuration files to identify the specific options that were selected for that system. This could result in thousands of different configuration files which can be very difficult to manage. A large number of different configuration files can also create significant complexity for the creation of collateral application software as well.

For example, intelligent devices may utilize configuration files such as Electronic Data Sheet (hereinafter "EDS") files in order to be used in an intelligent system. These EDS files are generally created to correspond with each catalog number. Where there may be a large number of catalog numbers, such as when a separate catalog number is needed to address multiple options and parameters, this would result in an equally large number of EDS files. These files must first be created, consuming valuable resources. Furthermore, these files are often obtained by the end user via an electronic download. Where a large number of EDS files exist, an end user may have to spend a significant amount of time searching for the EDS file that correspond to a particular device. Additionally, where a large number of catalog numbers exist, multiple software application profiles, such as "Add On Instructions" may be needed when interfacing with a visualization device (e.g., GUI, HMI, etc.).

Current intelligent devices such as intelligent electronic overload devices can often be used as remote control modules. This allows a user to utilize the power of the devices to configure the I/O on the device for specific applications. This is often done using an industrial automation programming architecture such as, for example, RSLOGIX from Rockwell Automation. However, this often requires a sophisticated user with a programming device, such as a computer with the necessary programming software, to program the intelligent device. However, often the devices are configured to correspond with commonly used application configurations. In these instances, the ability for a user to quickly configure an intelligent device such as an intelligent electronic overload device for a common application can significantly reduce installation and commissioning time for industrial automation systems.

There is a need, therefore, for systems and methods that enable efficient configuration when installing or replacing a network-enabled device.

The present embodiments overcome the aforementioned problems by providing systems and methods that enable emulation of a desired and/or legacy network-enabled device.

The various embodiments of the present disclosure will be described in connection with an intelligent electronic overload device adapted to couple to an electromagnetic contactor. However, it should be appreciated that the various aspects of the present disclosure can be applied in other configurations (e.g., any network-enabled device, network-enabled motor control device), not necessarily related to an electronic overload device, and that are capable of stand-alone operation or that can be coupled to other devices. It is also to be appreciated that any of the features described in the context of any of the embodiments are combinable with other embodiments described herein.

Embodiments of the present disclosure provide systems and methods for replacing a range of legacy network-enabled motor control devices using minimal effort. In particular, the presently disclosed systems and methods enable a replacement device to operate as if it were (e.g., emulation) a legacy device. In some embodiments, emulation can occur from a physical, electrical, and/or communication perspective, via a user input.

Turning now to the figures, FIG. 1 shows an exploded view of an intelligent electronic overload device 1000, according to some embodiments of the present disclosure. In some embodiments, the intelligent electronic overload device 1000 can have a modular design and can include a communication module 1002, a control module 1004, and/or a sensing module 1006. The control module 1004 can have input/output (hereinafter "I/O") connections 1008 that can be used for interfacing the intelligent electronic overload device 1000 with other devices. In some embodiments, the I/O 1008 can be configured by a user. The control module 1004 can also contain at least one memory device 1010. The memory device 1010 can be volatile or non-volatile. The communication module 1002 can interface to the intelligent electronic overload device 1000 with various network protocols. Some non-limiting example protocols that the communication module 1002 can interface with can include EthernetIP, DeviceNet, Profibus, and other network protocols for use in the desired application. The sensing module 1006 can be used to sense a current flow in a motor application. Furthermore, in some embodiments, the sensing module 1006 and the communication module 1002 can both electrically communicate with the control module 1004, and vice versa.

Many combinations of modules with multiple options can be provided to a user. This can result in a manufacturer being required to develop, and make available to end users, multiple intelligent device configuration files. An example intelligent device configuration file can be an Electronic Data Sheet ("EDS") file for use on a LOGIX based control system from Rockwell Automation. An EDS file can contain all the options and parameters for an intelligent device and it can often be required to have an EDS file for each unique intelligent device. Users can access EDS files for downloading into the intelligent electronic overload device 1000 or other intelligent device in multiple ways. For example, EDS files might be accessed via an internet web site, a CD-ROM, a flash memory, or other device or protocol suitable for data transmission. Furthermore, in some control systems, a visualization device 1018 may be utilized to view and configure intelligent system components such as the intelligent electronic overload device 1000. The visualization device 1018 may be a PANELVIEW from Rockwell Automation or other visualization device 1018. The visualization device 1018 may utilize a specific visualization configuration file to interface with an intelligent device. A unique visualization configuration file may be associated with each unique intelligent device configuration file 1014.

In some embodiments, a user can configure a new intelligent device using a configuration tool 1012, 1013. The configuration tool 1013 can be a computer program capable of being executed on a personal computer. Alternatively, the configuration tool 1012 can be embedded in a specific device for configuring intelligent devices. In some embodiments, a user can select the options that are installed on the intelligent electronic overload device 1000 using the configuration tool 1012, 1013. The configuration tool 1012, 1013 can communicate the selected options to a configuration file 1014 for the intelligent electronic overload device 1000. In some embodiments, the configuration file 1014 can be embedded in the memory device 1010 of the control module 1004 of the intelligent electronic overload device 1000. The configuration file 1014 can contain a plurality of status bits 1016 that correspond to each unique option available for the intelligent electronic overload device 1000.

Alternatively, the status bits 1016 can be separate from the configuration file 1014. In some embodiments, the status bits can 1016 can be contained in the real-time data presented to the intelligent electronic overload device 1000.

Once the configuration parameters have been selected, the parameters can be stored in the memory device 1010 of the control module 1004 of the intelligent electronic overload device 1000. However, when the intelligent electronic overload device 1000 is replaced with a newer or different device, the corresponding control module interface may need to be rewritten. As such, the present disclosure includes systems and methods for replacing a range of legacy network-enabled motor control devices using minimal time and user effort.

Existing replacement systems and methods require additional resources (time, money, wiring, etc.) to commission a newly installed network-enabled device. As one example, many vendors provide a wiring harness conversion kit for installation of a replacement network-enabled device. Other vendors offer a replacement network-enabled device that utilizes similar data structures to a legacy device. Some users create a conversion routine within the programmable logic controller to convert the new data structure type to the old data structure type, which can be tedious.

In some embodiments, a user can identify which network-enabled device that they want to emulate (e.g., the previously installed network-enabled device). This can be done, in some embodiments, via a user input to a user interface, Once the emulated device is identified, the communication interface (e.g., communication module 1002) for the replacement networked-enabled device can dynamically update its identity on the corresponding communication network to match that of the selected networked-enabled device.

In some embodiments, from a user perspective, the replacement networked-enabled device (when in an emulation mode), can operate and communicate in nearly all aspects of a networked-based system as if it were the selected network-enabled device. In particular, a network-enabled motor control device can operate seamlessly within an industrial automation system, with little to no reconfiguration of device parameters, as one non-limiting example.

In some embodiments, the installed network-enabled device can intercept all communication requests (e.g., messages) from a programmable logic controller that previously communicated with the selected (e.g., previously installed) network-enabled device. Further, the installed network-enabled device can internally remap configuration, diagnostic, input, and/or output data to the network-enabled device's original/preferred format.

Figure 2:
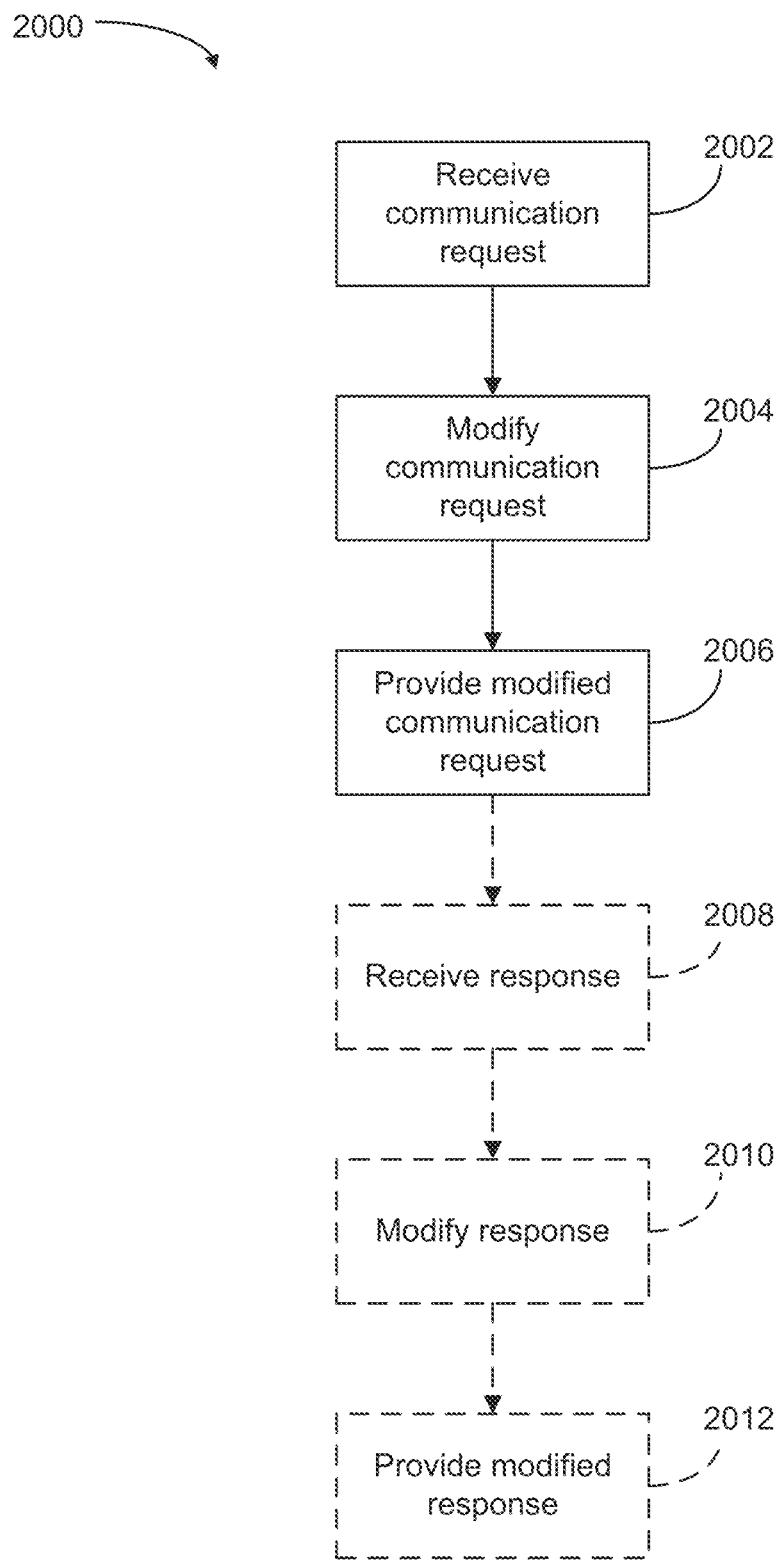
FIG. 2 is a flow-chart illustrating a method of motor control device emulation, according to embodiments of the present disclosure.

Referring now to FIG. 2, a method 2000 of motor control device emulation is shown, according to embodiments of the present disclosure. In some embodiments, the method 2000 can be carried out via the intelligent electronic overload device 1000 (FIG. 1), as described above. As shown, method 2000 includes receiving a communication request at process block 2002. In some embodiments, the communication request can be received via a network-enabled motor control device. Further, the communication request can correspond to an emulated motor control device. Method 2000 is shown to include modifying the communication request at process block 2004. In some embodiments, the communication request can be modified to match an expected communication request. As shown, method 2000 further includes providing a modified communication request at process block 2006. In some embodiments, the modified communication request can be provided to an associated hardware module within the network-enabled motor control device. Additionally, the expected communication request can be based on the network-enabled motor control device.

Still referring to FIG. 2, method 2000 is shown to optionally include receiving a response at process block 2008. In some embodiments, the response can be received from the associated hardware module. Additionally, method 2000 is shown to optionally include modifying the response at process block 2010. The response can be modified to match an expected response, in some embodiments. Method 2000 is further shown to optionally include providing a modified response. The modified response can be provided via the network-enabled motor control device. Additionally, in some embodiments, the modified response can be based on the emulated motor control device.

Figure 3A:
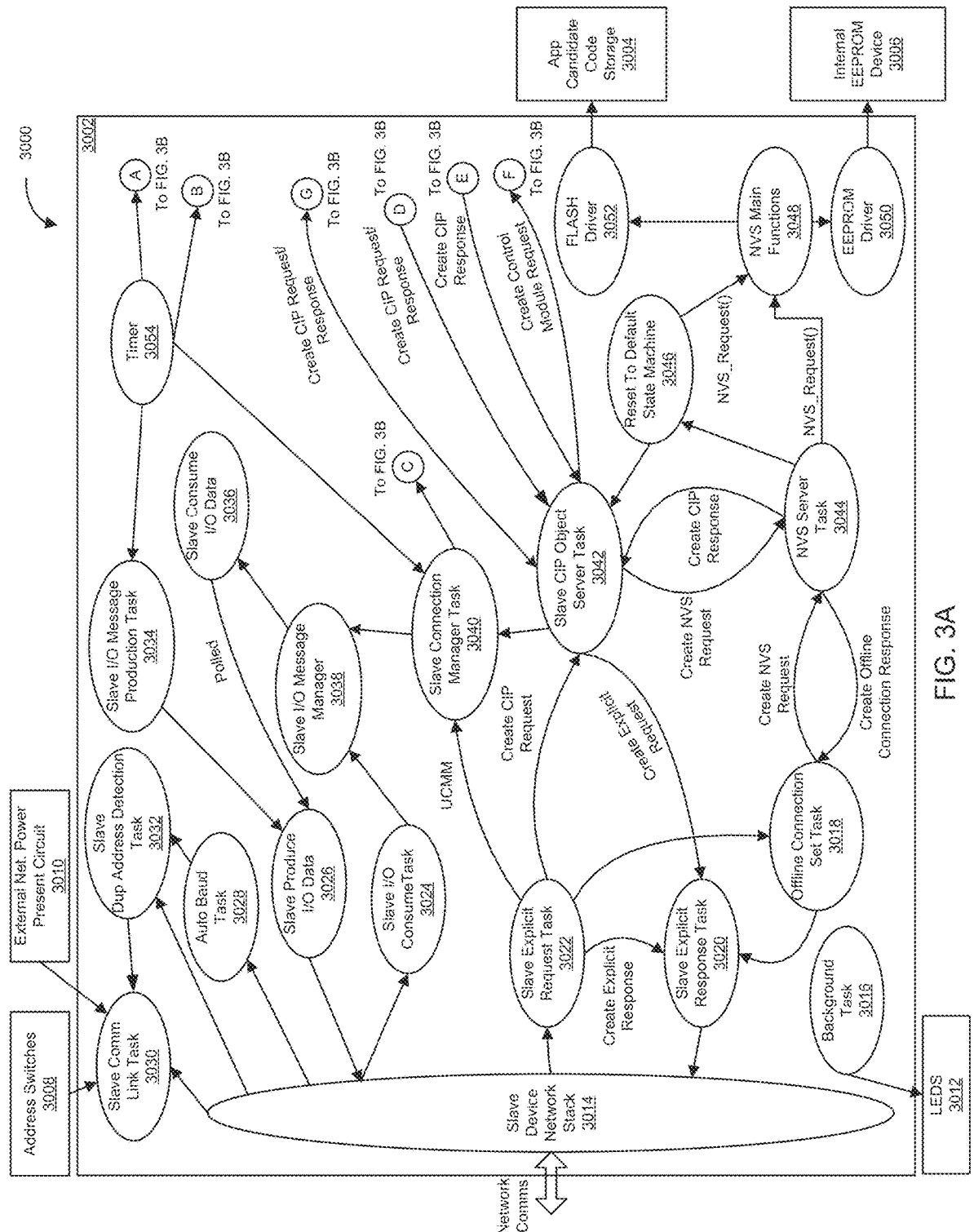
FIG. 3A is a flow-chart illustrating an emulation communication process, according to embodiments of the present disclosure.
Figure 3B:
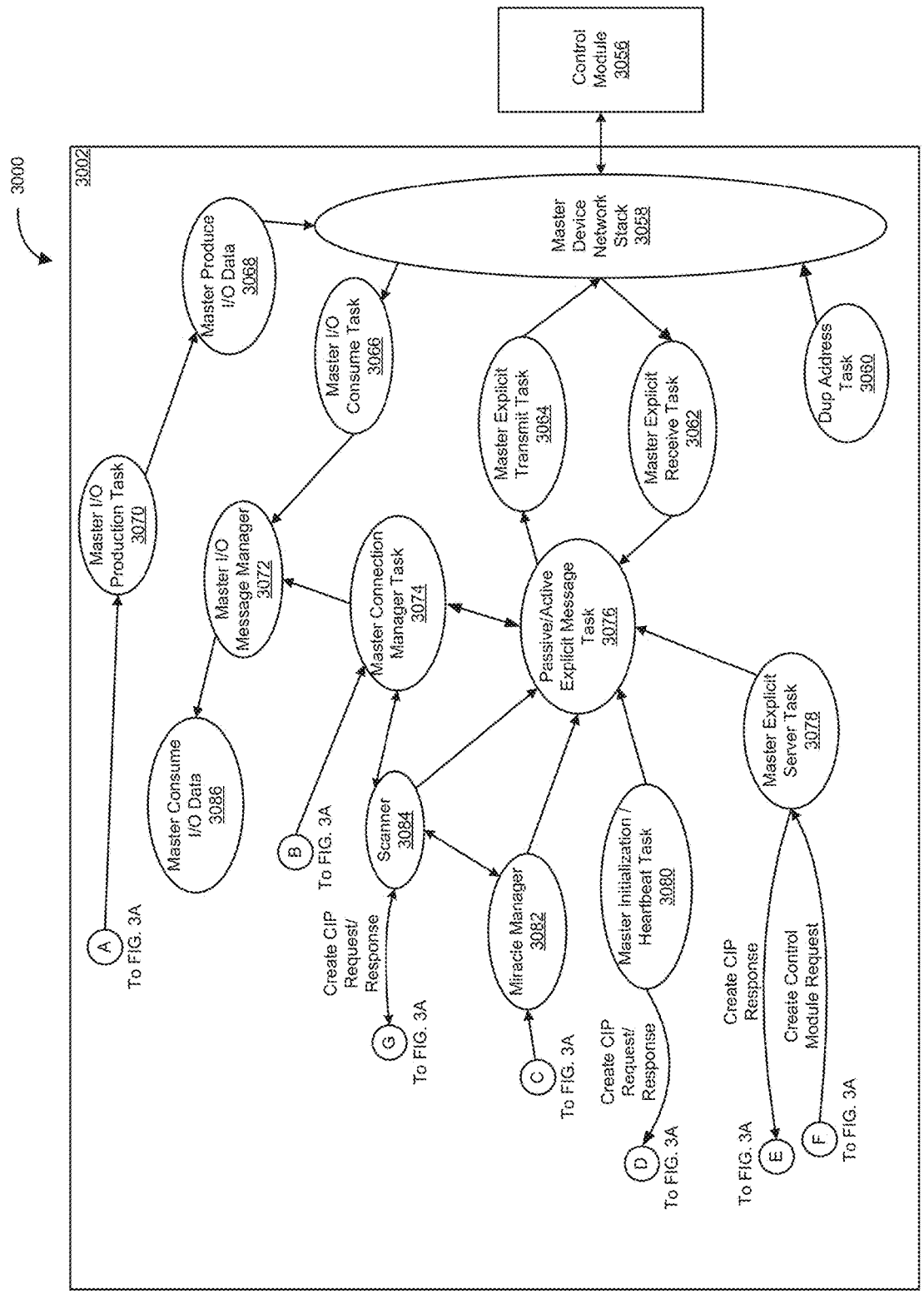
FIG. 3B is another view of the flow-chart of FIG. 3A illustrating an emulation communication process, according to embodiments of the present disclosure.

Referring now to FIGS. 3A-3B, a flow-chart illustrating an emulation communication process 3000 is shown, according to embodiments of the present disclosure. As shown, each of nodes A-F represent connection points that would otherwise be continuous lines if represented in a single Figure. It is to be understood that node A in FIG. 3A corresponds to node A in FIG. 3B, node B in FIG. 3A corresponds to node B in FIG. 3B, node C in FIG. 3A corresponds to node C in FIG. 3B, etc.

In some embodiments, the emulation communication process 3000 can be executed via the intelligent electronic overload device 1000 (FIG. 1), as described above. As shown, a communication module 3002 includes a plurality of inputs, outputs, and internal modules. In some embodiments, the communication module 3002 can be the same or similar to communication module 1002, as described with respect to FIG. 1.

As shown, the communication module 3002 can communicate with application candidate code storage module 3004, internal EEPROM device 3006, address switches 3008, external network power present circuit 3010, LEDS 3012, and/or control module 3056 (which may be the same or similar to control module 1004). Additionally, as shown by FIG. 3A, the communication module 3002 can communicate over a communication network (e.g., an industrial automation network).

As shown, in some embodiments, a slave device network stack 3014 can be in communication with a slave comm (communication) link task 3030, a slave dup (duplicate) address detection task 3032, an auto baud task 3028, a slave produce I/O data 3026, a slave I/O consume task 3024, a slave explicit request task 3022, and/or a slave explicit response task 3020. In generally, each of the slave device network stack 3014, the slave comm link task 3030, the slave dup address detection task 3032, and the auto baud task 3028 can configure and/or control access to the slave port. Further, each of the slave produce I/O data 3026, and the slave I/O consume task 3024 can implement I/O connections for the slave port. Additionally, each can consume and/or produce the slave's I/O data. In some embodiments, each of the slave explicit request task 3022, and the slave explicit response task 3020 can implement explicit connections and/or process explicit messages for the slave port. As shown, the slave explicit request task 3022 can create and communicate an explicit response to the slave explicit response task 3020.

In some embodiments, the slave explicit request task 3022 can communicate with an offline connection set task 3018, a slave CIP object server task 3042, and/or a slave connection manager task 3040. As shown, for example, the slave explicit request task 3022 can create and communication a CIP request to a slave CIP object server task 3042. Similarly, the slave explicit request task 3022 can communicate a UCMM (unconnected message manager) message to a slave connection manager task 3040. The slave CIP object server task 3042 can create and communicate an explicit request to the slave explicit response task 3020. As shown, the slave CIP object server task 3042 can communicate with the slave connection manager task 3040. In some embodiments, the offline connection set task 3018 can respond to offline messages. Additionally, each of the slave CIP object server task 3042 and the slave connection manager task 3040 can implement explicit connections and/or process explicit messages for the slave port.

As shown, in some embodiments, the offline connection set task 3018 can create and communicate an NVS (non-volatile storage) request to an NVS server task 3044. Similarly, the NVS server task 3044 can create and communicate an offline connection response to the offline connection set task 3018. Additionally, the slave CIP object server task 3042 can create and communicate an NVS request to the NVS server task 3044. Similarly, the NVS server task 3044 can create and communicate a CIP response to the slave CIP object server task 3042. In some embodiments, the NVS server task 3044 can control access to the system non-volatile storage. As shown, the NVS server task 344 can communicate with a reset to default state machine task 3046, In some embodiments, the reset to default state machine task 3046 can block non-volatile storage access during a reset. The reset to default state machine task 3046 can communicate an NVS request to NVS main functions 3048, as shown. Similarly, the NVS server task 3044 can communicate an NVS request to NVS main functions 3048, In some embodiments, the NVS main functions 3048 can control access to the system non-volatile storage.

Still referring to FIGS. 3A-3B, the NVS main functions 3048 can communicate with a FLASH driver 3052, and/or an EEPROM driver 3050, As shown, the FLASH driver 3052 can communicate with the app candidate code storage 3004, and, the EEPROM driver 3050 can communicate with the internal EEPROM device 3006. Each of the EEPROM driver 3050 and the FLASH driver 3052 can control access to the system non-volatile storage, according to some embodiments.

As shown, in some embodiments, the slave I/O consume task 3024 can be in communication with a slave I/O message manager 3038. Additionally, the slave connection manager task 3040 can be in communication with the slave I/O message manager 3038. In some embodiments, the slave I/O message manager 3038 can implement I/O connections for the slave port, and can consume and/or produce the slave's I/O data. The slave I/O message manager 3038 can additionally communicate with slave consume I/O data 3036. The slave I/O data 3036 can implement I/O connections for the slave port, and can consume and/or produce the slave's I/O data, according to some embodiments. Further, as shown, the slave consumer I/O data 3036 can communicate with the slave produced I/O data 3026, via polling.

In some embodiments, the slave produce I/O data 3026 can communicate with a slave I/O message production task 3034. The slave I/O message production task 3034 can implement I/O connections for the slave port, and can consume and/or produce the slave's I/O data. As shown, the slave I/O message production task 3034 can be in communication with a timer 3054. Similarly, the timer 3054 can be in communication with the slave connection manager task 3040, a master I/O production task 3070, and/or a master connection manager task 3074. The timer 3054 can trigger events within the system. In some embodiments, the time 3054 can be a 1 millisecond timer. Alternatively, a different time can be implemented via the timer 3054. In some embodiments, the master I/O production task 3070 can implement I/O connections for the master port, and can consume and/or produce the master's I/O data. Additionally, the master connection manager task 3074 can implement explicit connections and/or process explicit messages for the master port.

As shown, the slave connection manager task 3040 can communicate with a miracle manager 3082. The miracle manager 3082 can coordinate the state of the slave port's I/O and explicit connections with the state of the master port's I/O and explicit connections, in some embodiments.

Still referring to FIGS. 3A-3B, the slave CIP object server task 3042 can be in communication with a scanner 3084. In some embodiments, as shown, the scanner 3084 can communicate with the miracle manager 3082 and/or the master connection manager task 3074. In some embodiments, a CIP request/response can be created and communication between the slave CIP object server task 3042 and the scanner 3084. Similarly, the slave CIP object server task 3042 can be in communication with a master initialization heartbeat task 3080, which can create and communication a CIP request/response. Additionally, as shown, the slave CIP object server task 3042 can be in communication with a master explicit server task 3078, which can create and communication a CIP request/response. In some embodiments, the scanner 3084 can implement I/O connections for the master port. Additionally, the scanner 3084 can consume and/or produce the master's I/O data. The master initialization heartbeat task 3080 can manage status information to and from the control module. In some embodiments, the master explicit server task 3078 can implement explicit connections and/or process explicit messages for the master port.

In some embodiments, the master I/O production task 3070 can communicate with a master produce I/O data task 3068. The master produce I/O data task 3068 can implement I/O connections for the master port. Additionally, the master produce I/O data task 3068 can consume and/or produce the master's I/O data. In some embodiments, the master produce I/O data 3068 can communicate with a master device network stack 3058. The master device network stack 3058 can control access to the master port. As shown, the master device network stack 3058 can communicate with the control module 3056.

As shown, a master consume I/O data task 3086 can be in communication with a master I/O message manager 3072. In some embodiments, the master consumer I/O data task 3086 can implement I/O connections for the master port. Additionally, the master consumer I/O data task 3086 can consume and/or produce the master's I/O data. The master I/O message manager 3072 can implement I/O connections for the master port, and can consume and/or produce the master's I/O data. As shown, the master I/O message manager 3072 can be in communication with a master I/O consume task 3066. In some embodiments, the master I/O consume task 3066 can implement I/O connections for the master port. Additionally, the master I/O consume task 3066 can consume and/or produce the master's I/O data. The master I/O consume task 3066 can communicate with the master device network stack 3058, according to some embodiments.

In some embodiments, the master connection manager task 3074, the scanner 3084, the miracle manager 3082, the master initialization heartbeat task 3080, and/or the master explicit server task 3078 can be in communication with a passive/active explicit message task 3076. The passive/active explicit message task 3076 can implement explicit connections and/or process explicit messages for the master port. As shown, the passive/active explicit message task 3076 can be in communication with a master explicit transmit task 3064, and/or a master explicit receive task 3062. In some embodiments, the master explicit transmit task 3064 can implement explicit connections and/or process explicit messages for the master port. Additionally, the master explicit receive task 3062 can implement explicit connections and/or process explicit messages for the master port.

Still referring to FIGS. 3A-3B, a duplicate address task 3060 can be in communication with the master device network stack 3058. The duplicate address task 3060 can control access to the master port. Additionally, a background task 3016 can be in communication with the LEDS 3012. In some embodiments, the background task 3016 can operate simple system functions (e.g., updating LEDs, producing heartbeat messages, storing address switches and baud rate values). As shown, the communication module 3002 includes a plurality of inputs, outputs, and internal modules. In some embodiments, additional inputs, outputs, and/or internal modules can be included with respect to communication module 3002. Alternatively, in some embodiments, fewer inputs, outputs, and/or internal modules can be included with respect to communication module 3002.

Figure 4:
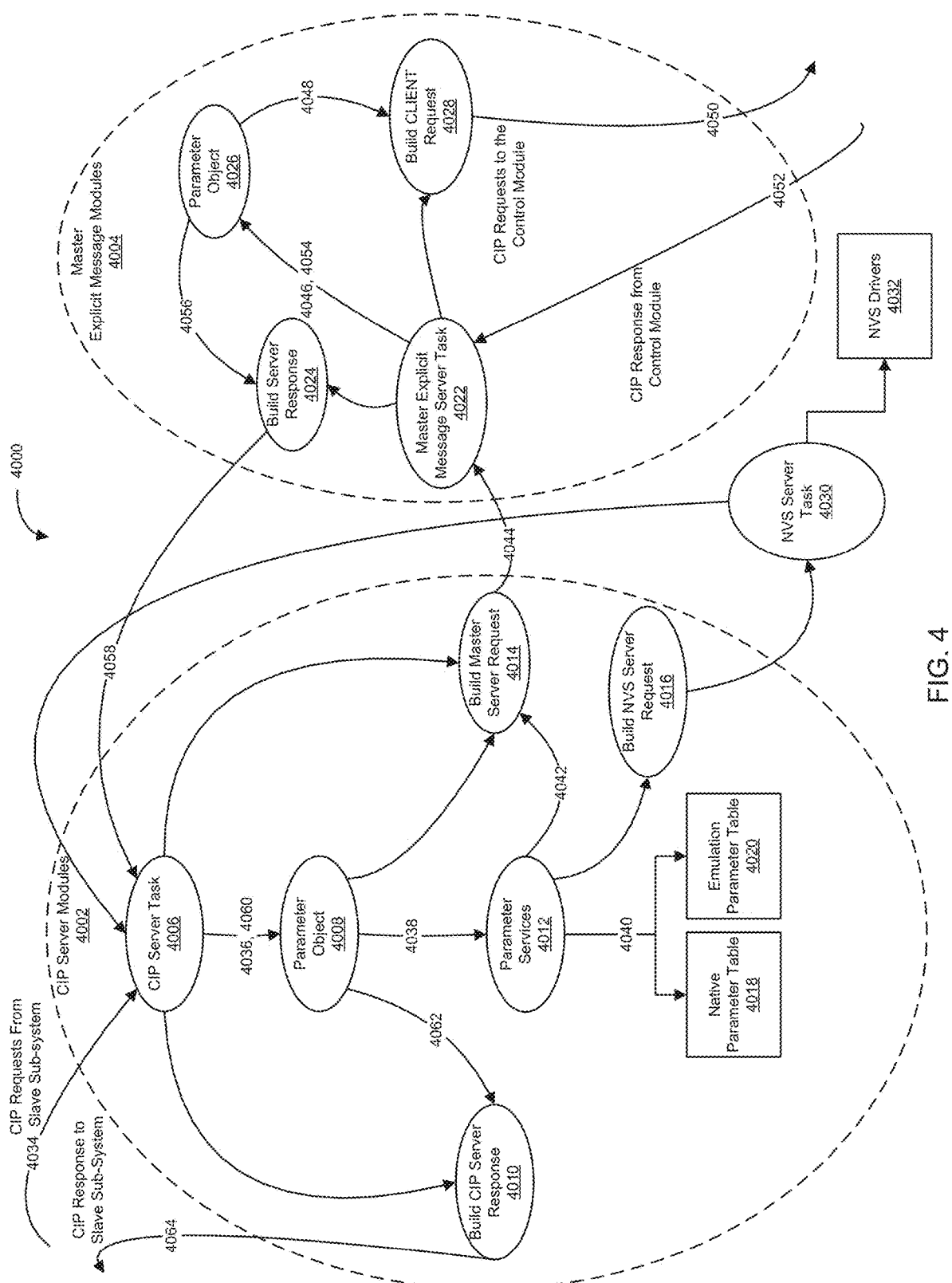
FIG. 4 is a flow-chart illustrating a process for converting communication requests for an emulated device, according to embodiments of the present disclosure.
Figure 5A:
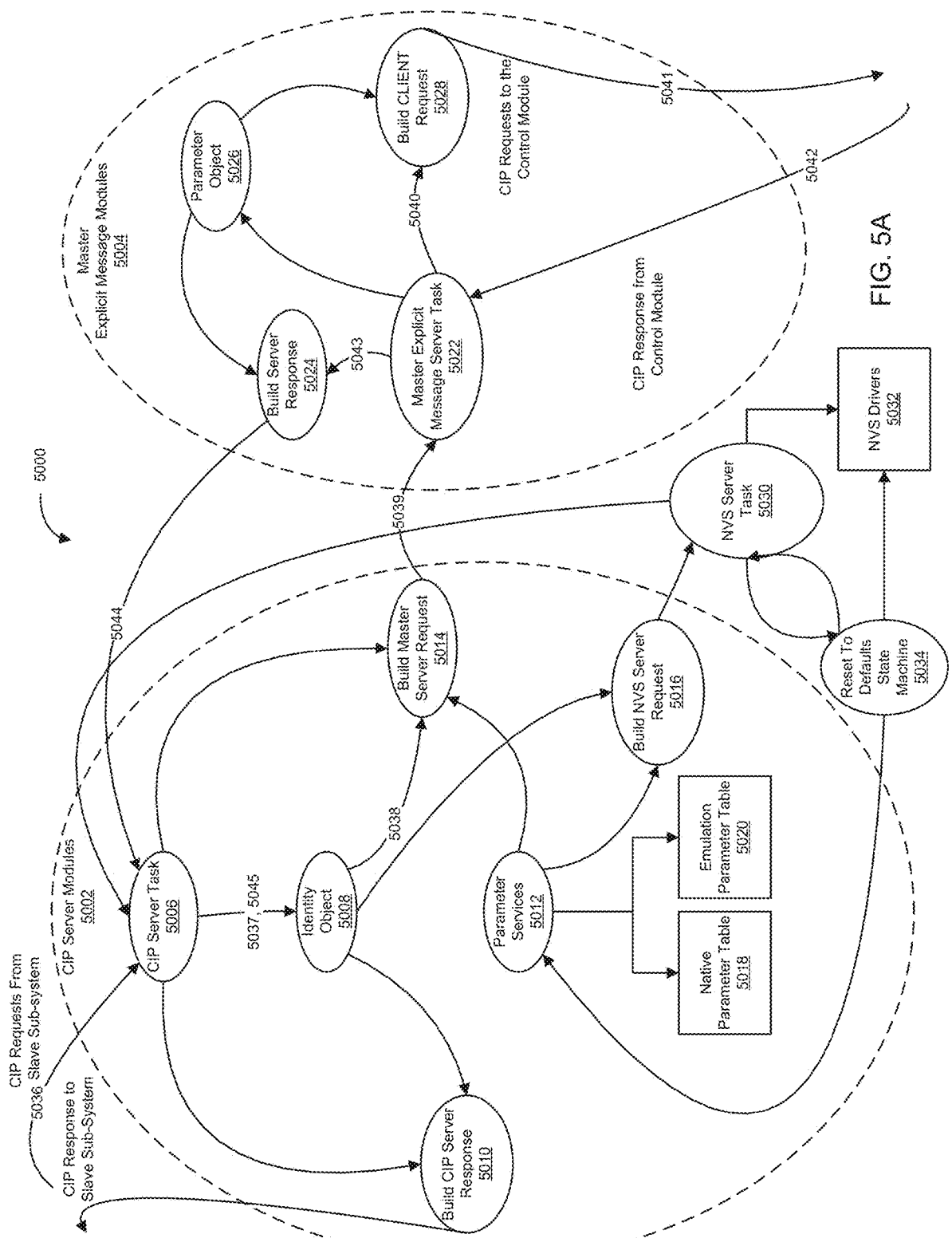
FIG. 5A is a flow-chart illustrating the process of resetting an emulated device back to default settings, according to embodiments of the present disclosure.
Figure 5B:
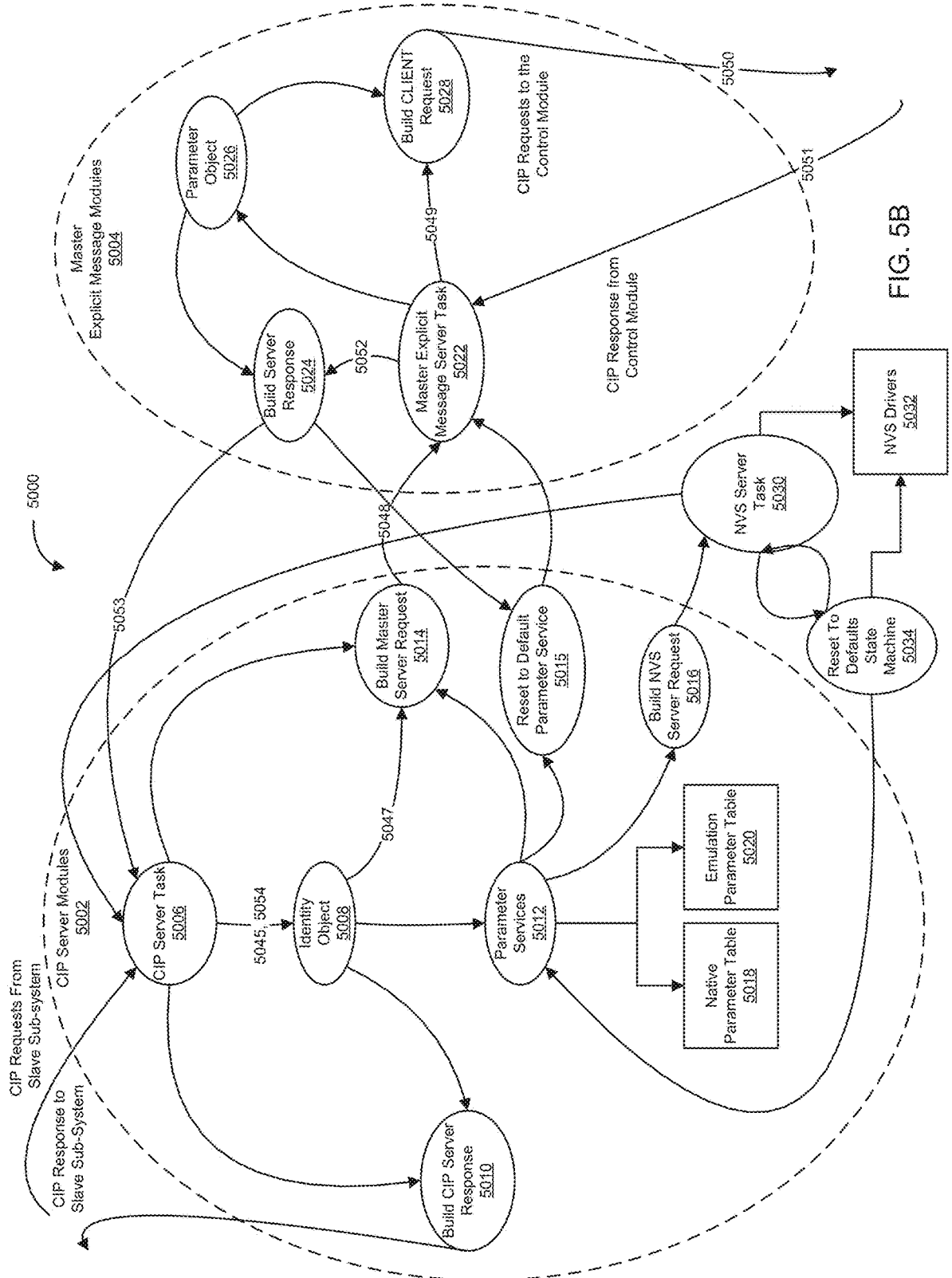
FIG. 5B is another view of the flow-chart of FIG. 5A illustrating the process of resetting an emulated device back to default settings, according to embodiments of the present disclosure.
Figure 5C:
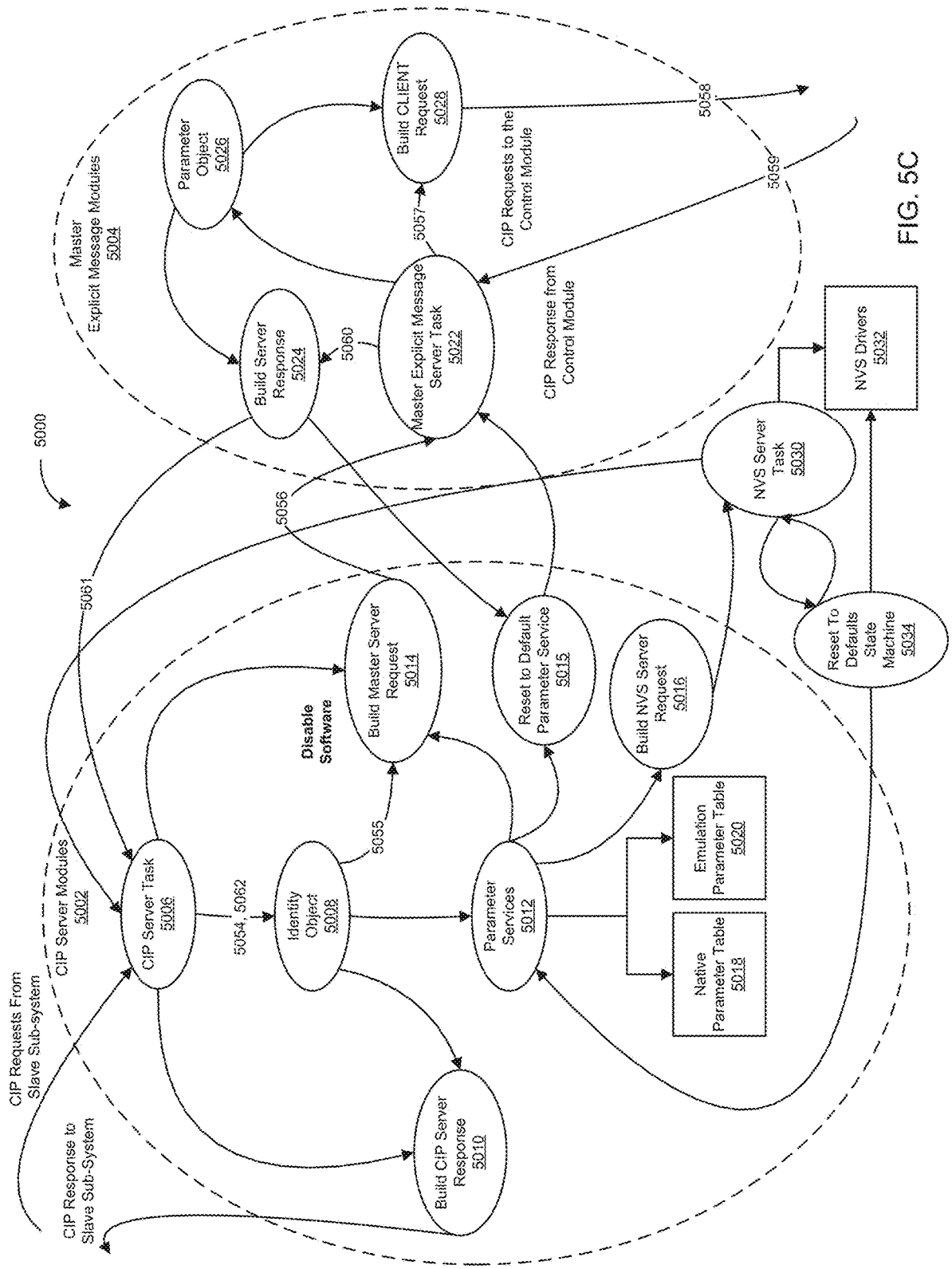
FIG. 5C is another view of the flow-chart of FIG. 5A illustrating the process of resetting an emulated device back to default settings, according to embodiments of the present disclosure.
Figure 5D:
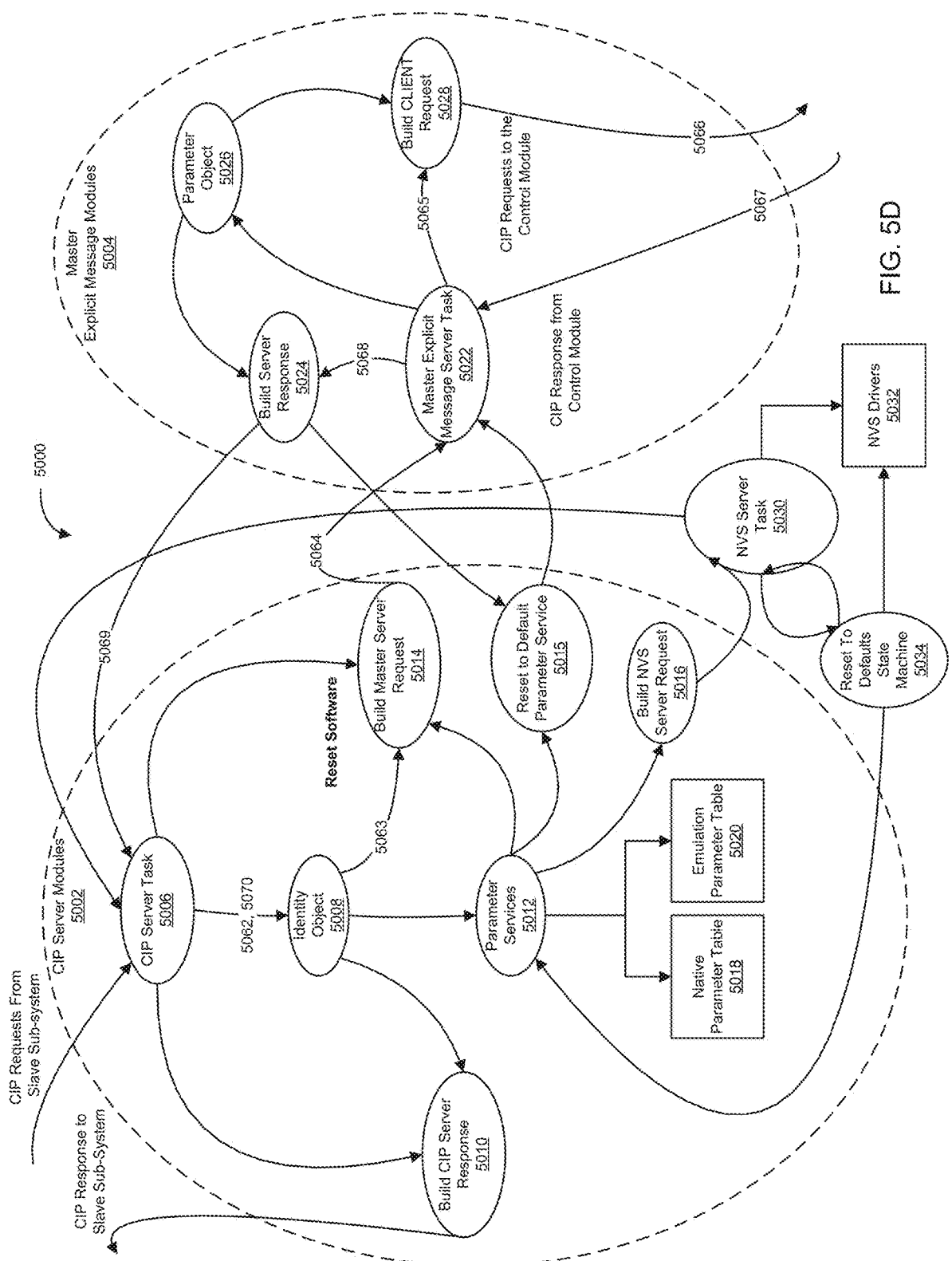
FIG. 5D is another view of the flow-chart of FIG. 5A illustrating the process of resetting an emulated device back to default settings, according to embodiments of the present disclosure.
Figure 5E:
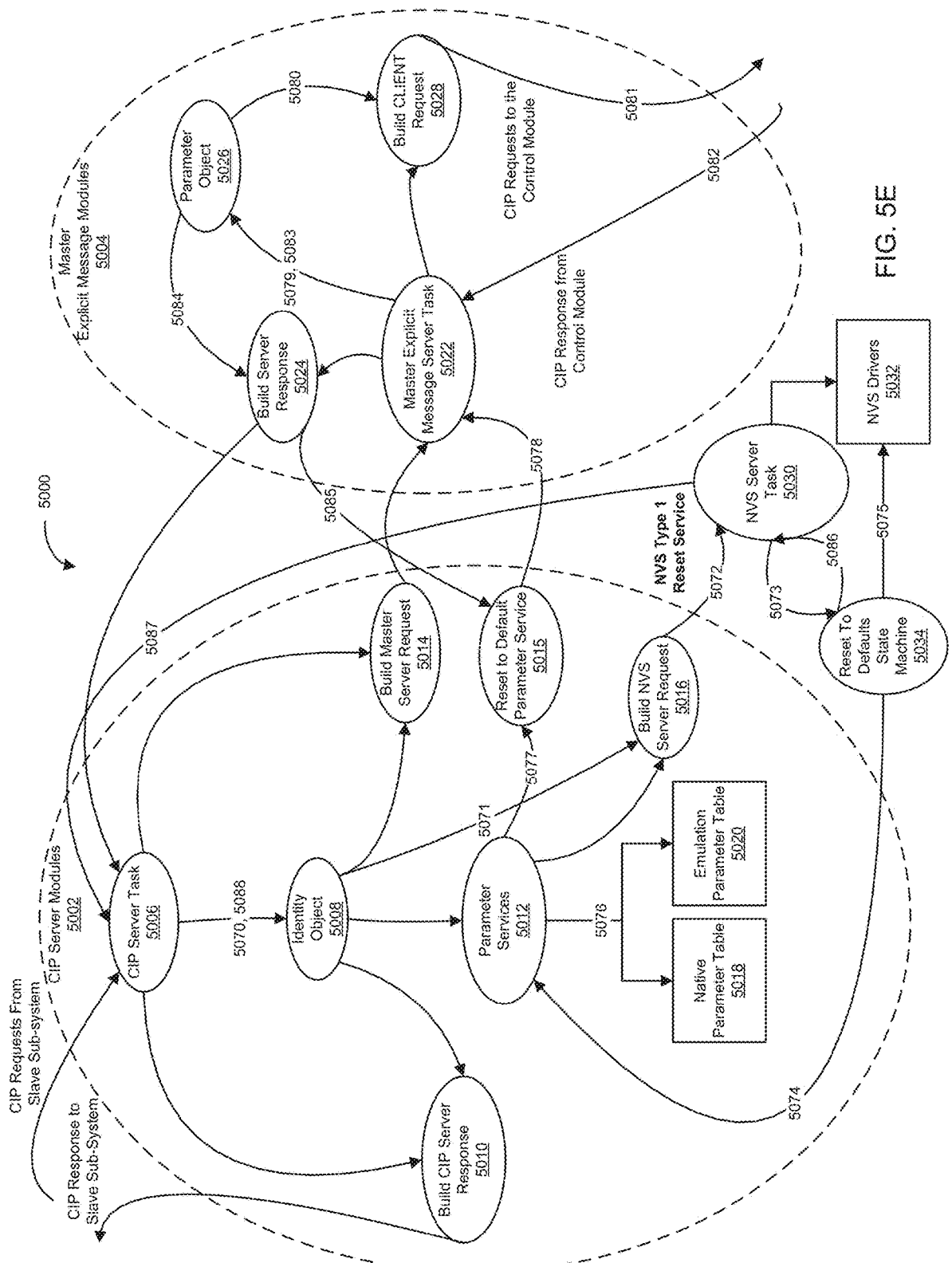
FIG. 5E is another view of the flow-chart of FIG. 5A illustrating the process of resetting an emulated device back to default settings, according to embodiments of the present disclosure.
Figure 5F:
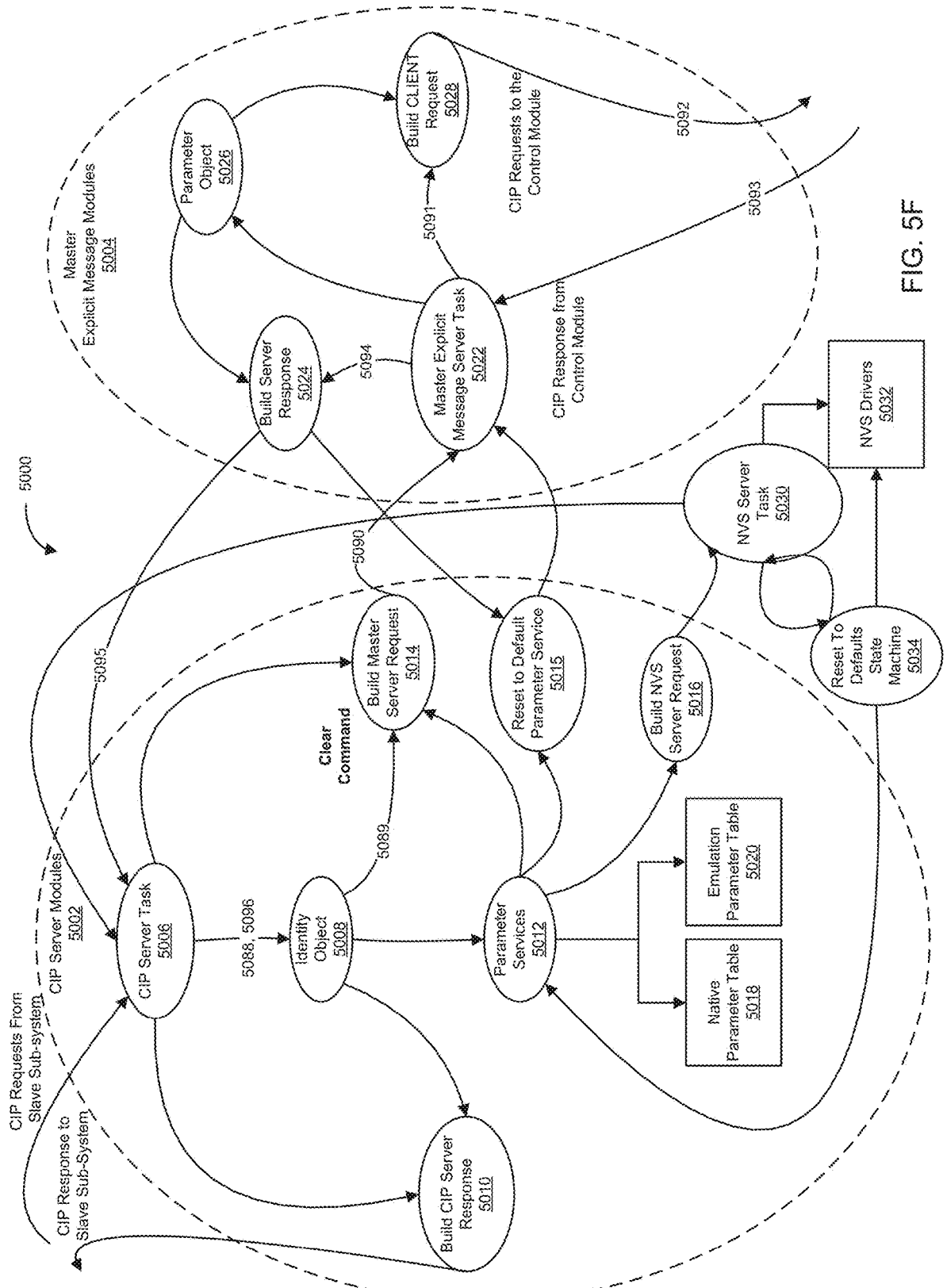
FIG. 5F is another view of the flow-chart of FIG. 5A illustrating the process of resetting an emulated device back to default settings, according to embodiments of the present disclosure.
Figure 5G:
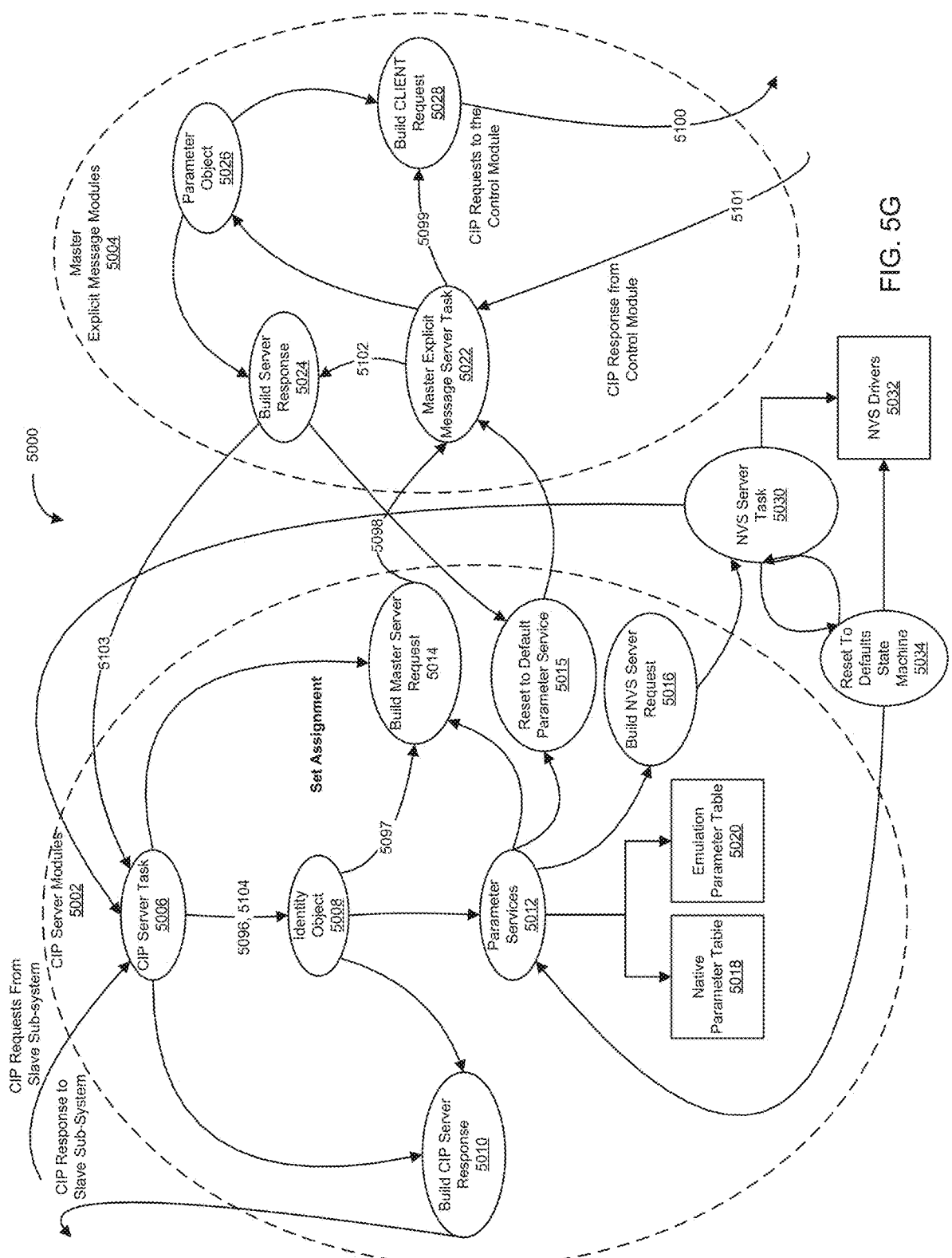
FIG. 5G is another view of the flow-chart of FIG. 5A illustrating the process of resetting an emulated device back to default settings, according to embodiments of the present disclosure.
Figure 5H:
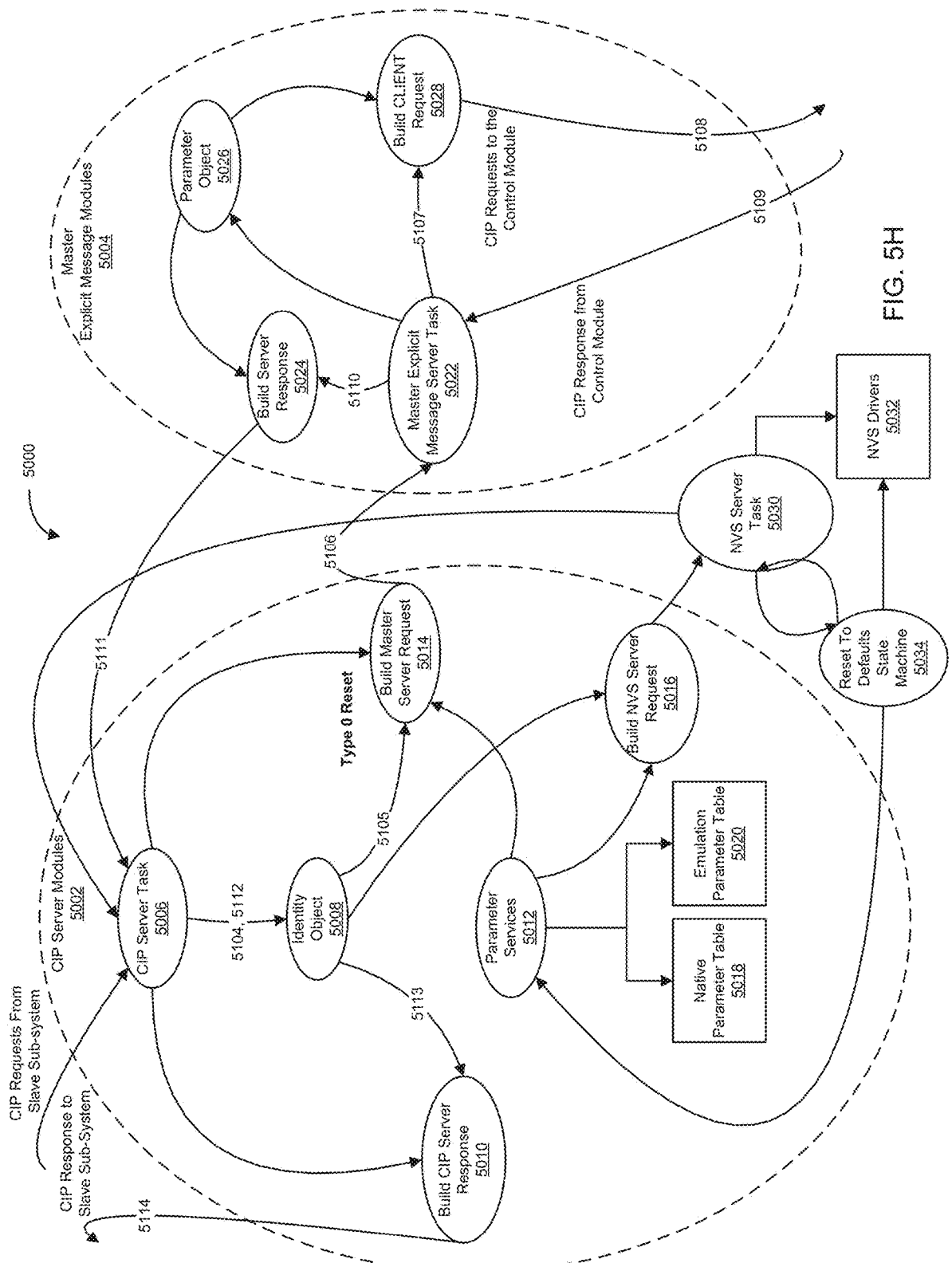
FIG. 5H is another view of the flow-chart of FIG. 5A illustrating the process of resetting an emulated device back to default settings, according to embodiments of the present disclosure.

Referring now to FIG. 4, a flow-chart illustrating a process 4000 for converting communication requests for an emulated device is shown, according to some embodiments. Emulating a device may require an actual device to operate and function just like the device it is emulating. To achieve true device emulation on another device, a conversion of communication read and write commands for the emulated device to the actual device can be performed. According to some embodiments, when the device receives a communication request, it first determines if the communication request is for the actual device or for an emulated device. For actual device communication requests, the process 4000 can send the communication request to the appropriate hardware module with no modifications. For emulated device communication requests, the process 4000 can manage the communication request by modifying the emulated communication request to match an expected communication request of the actual device and modify the response of the actual device to match an expected response of the emulated device.

The process 4000 can be performed by the communication module 3002, in some embodiments. As shown, the process 4000 can include a plurality of server modules (e.g., CIP server modules 4002) and a plurality of master modules (e.g., master explicit message modules 4004). In some embodiments, the CIP server modules 4002 can communicate with a slave sub-system (e.g., via the slave device network stack 3014, as shown in FIG. 3A). Additionally, the master explicit message modules 4004 can communicate with a control module (e.g., the control module 3056 via the master device network stack 3058).

As shown, the CIP server modules 4002 can include a CIP server task 4006, a parameter object 4008, a build CIP server response task 4010, parameter services 4012, a build master server request task 4014, a build NVS server request 4016, a native parameter table 4018, and/or an emulation parameter table 4020. In some embodiments, the build NVS server request 4016 and/or the CIP server task 4006 can communicate with an NVS server task 4030. Additionally, the NVS server task 4030 can communicate with NVS drivers 4032.

As shown, the master explicit message modules 4004 can include a parameter object 4026, a build server response task 4024, a master explicit message server task 4022, and/or a build CLIENT request task 4028. The process 4000 for converting communication requests for an emulated device can have several process steps, which are described in detail below.

In some embodiments, at process step 4034, a CIP Server Request message can be sent to the CIP Server Task 4006 to be processed. At process step 4036, the CIP Server Task 4006 can process the class field of the request and route the request to the Parameter Object 4008. Further, at process step 4038, the Parameter Object 4008 can decode the Service, Instance and Attribute of the request and determine that the request needs to access the parameter table. The parameter object 4008 can call the appropriate parameter table function to complete the request, in this non-limiting example, a read parameter service. In some embodiments, at process step 4040, the parameter table function (e.g., parameter services 4012) can access the correct parameter table for the information to complete the request. In this non-limiting example, the information needed is not contained in the parameter tables (e.g., native parameter table 4018 and emulation parameter table 4020). Parameter services 4012 can then create a request to send to the control module (e.g., control module 3056), allowing the control module to process the request.

Still referring to FIG. 4, at process step 4042, the build master server request 4014 can create a new CIP Client Request message, populate it with the request data from the initial request, and send the request to the Master Explicit Message Server Task 4022. Parameter services 4012 can then return a "service in progress" status (or similar status) back to the parameter object 4008. The Parameter Object 4008 can then stop processing the request. In some embodiments, at process step 4044, the Master Explicit Message Server Task 4022 can receive the new request and determine how to process it. The CIP client request message router in the Master Explicit Message Server Task 4022 can look at the request and determine how to route the request, since the system is in an emulation mode in this non-limiting example, the parameter object request can be routed to the Parameter Object 4026 for translation, pre- and post-scaling.

In some embodiments, at process step 4046, the Parameter Object 4026 can be responsible for translating emulation device parameters to actual device parameters, and applying any pre-control module request processing (e.g., scaling). Additionally, at process step 4048, the Parameter Object 4026 can call the Build Client Request task 4028, and send the request to the control module (e.g., control module 3056). At process step 4050, the Build Client Request task 4028 can create a new "Passive/Active" request and send the request on to the Master subsystem, to be sent to the control module (e.g., control module 3056).

Still referring to FIG. 4, at process step 4052, the Master subsystem can send a response from the control module (e.g., control module 3056) to the Master Explicit Message Server Task 4022. The Master Explicit Message Server Task 4022 can receive the new request and determine how to process it. Since, in this non-limiting example, this is a CIP Client response message, the CIP client response message router in the Master Explicit Message Server Task 4022 can look at the request and determine how to route the request. Since the system is in an Emulation mode in this non-limiting case, the response can be routed back to the Parameter Object 4026 for post response processing.

In some embodiments, at process step 4054, the Parameter Object 4026 can perform post response processing. In some cases where multiple actual device parameters are used to build the emulated device parameter, process steps 4046 through 4054 may be repeated multiple times to completely build the emulated device parameter. The initial CIP Client Request message can have a "sequence count" field that can be used to keep track of the number of times through the Parameter Object 4026. The Parameter Object 4026 may also apply post scaling to the control module response data before routing the response back. Further, at process step 4056, the build server Response task 4024 can allocate memory for a response message, and can populate the new request and send the request to the return mailbox in the initial CIP Server Request message.

In some embodiments, at process step 4058, the CIP Server Task 4006 can receive the Client Response message and determine how to process the response. The Client response message router in the CIP Server Task 4006 can look at the initial CIP request and determine how to route the NVS response, in this non-limiting case, the parameter object 4008 may do some post response processing, so the response is sent back to the parameter object 4008. Additionally, at process step 4060, the parameter object 4008 can perform any post response processing before sending the response back to the requester by calling the build CIP Server Response task 4010. Not shown in FIG. 4—in the case of a parameter "Get All" service, post processing may include calling the parameter services to complete the "Get All" service data).

In some embodiments, at process step 4062, the CIP Server Task 4006 can call the build CIP Server Response task 4010. Further, at process step 4064, the Build CIP Server Response task 4010 can allocate memory for a response message to the slave sub-system, populate the new request and send the request to the return mailbox in the initial CIP Server Request message. Accordingly, process 4000 can achieve true device emulation on another device, via the conversion of communication read and write commands for the emulated device to the actual device.

Referring now to FIGS. 5A-5H, a process 5000 of resetting an emulated device back to default settings is shown, according to embodiments of the present disclosure. The restoring of factory default settings for an emulated device can begin by verifying that the actual device is in a state in which factory default settings can be applied. If the device is in the proper state, the process 5000 can restore default configuration parameters settings for the device, and the device's logic engine can be disabled, cleared, and placed into a state that can receive customized control logic. The process 5000 can then apply the appropriate default configuration parameter values for the emulated device, clear all internal historical data for the device, and apply the appropriate output assignments for the emulated device. Finally, the process 5000 can perform a power cycle on the device to place all restored configuration settings into effect.

The process 5000 can be performed by the communication module 3002, in some embodiments. As shown, the process 5000 can include a plurality of server modules (e.g., CIP server modules 5002) and a plurality of master modules (e.g., master explicit message modules 5004). In some embodiments, the CIP server modules 5002 can communicate with a slave sub-system (e.g., via the slave device network stack 3014, as shown in FIG. 3A). Additionally, the master explicit message modules 5004 can communicate with a control module (e.g., the control module 3056 via the master device network stack 3058).

As shown, the CIP server modules 5002 can include a CIP server task 5006, an identity object 5008, a build CIP server response task 5010, parameter services 5012, a build master server request task 5014, a build NVS server request 5016, a native parameter table 5018, and/or an emulation parameter table 5020. In some embodiments, the build NVS server request 5016 and/or the CIP server task 5006 can communicate with an NVS server task 5030. Additionally, the NVS server task 5030 can communicate with NVS drivers 5032, and/or a reset to defaults state machine task 5034. The reset to defaults state machine task 5034 can communicate with the parameter services 5012.

As shown, the master explicit message modules 5004 can include a parameter object 5026, a build server response task 5024, a master explicit message server task 5022, and/or a build CLIENT request task 5028. The process 5000 for resetting an emulated device back to default settings can have several process steps, which are described in detail below.

In some embodiments, at process step 5036, a CIP Server Request message can be sent to the CIP Server Task 5006 to be processed, Additionally, at process step 5037, the CIP Server Task 5006 can process the class field of the request and route the request to the Identity Object 5008. In some embodiments, at process step 5038, the Identity Object 5008 can decode the Service, Instance and Attribute of the request and determine that the request is a type 1 reset. The Identity object 5008 can check if the control module (e.g., control module 3056) is in a state to perform a type 1 reset. This can be done by sending a type 100 reset to the control module (e.g., control module 3056). The Identity Object 5008 can call the Build Client Request 5028 to send the type 100 reset.

As shown, at process step 5039, the Build Master Server Request task 5014 can create a new CIP Client Request message, populate it with the request data (type 100 reset) and send the request to the Master Explicit Message Server Task 5022. Further, at process step 5040, the Master Explicit Message Server Task 5022 can receive the new request and determine how to process it. The CIP client request message router in the Master Explicit Message Server Task 5022 can look at the request and determine how to route the request, in this non-limiting case, the request just needs to be routed to the control module (e.g., control module 3056) for processing. The Master Explicit Message Server Task 5022 can call the Build Client Request task 5028. At process step 5041, the Build Client Request task 5028 can create a new "Passive/Active" request and send the request on to the Master subsystem to be sent to the control module (e.g., control module 3056).

In some embodiments, at process step 5042, the Master subsystem can send the response from the control module (e.g., control module 3056) to the Master Explicit Message Server Task 5022, The Master Explicit Message Server Task 5022 can receive the new request and determine how to process it. Since this non-limiting example is a CIP Client response message, the CIP client response message router in the Master Explicit Message Server Task 5022 can look at the request and determine how to route the request, in this non-limiting case, there is no post response processing that is needed, so the response can be routed back to the return mailbox.

As shown, at process step 5043, the Master Explicit Message Server Task 5022 can call the Build Client Request task 5028, Further, at process step 5044, the Build Client Response task 5024 can allocate memory for a response message, populate the new request and send the request to the return mailbox in the initial CIP Server Request message.

Additionally, at process step 5045, the CIP Server Task 5006 can receive the Client Response message and determine how process the response. The Client response message router in the CIP Server Task 5006 can look at the initial CIP request and determine how to route the NVS response. In this non-limiting case, the Identity object 5008 can do post response processing, so the request is routed back to the Identity Object 5008.

In some embodiments, at process step 5047, the Identity Object 5008 can decode the Initial Service, Instance and Attribute of the request and determines that the request was a type 1 reset. The Identity object 5008 can check the response to see if the control module (e.g., control module 3056) is in a state to perform a type 1 reset, if so the next step can be started. In some embodiments, the next step can be to set a configuration parameter (e.g., [P164]-ConfgPreset) to "factory default." The Identity Object 5008 can call the Build Client Request task 5028 to send the new request. Additionally, at process step 5048, the Build Master Server Request task 5014 can create a new CIP Client Request message, populate it with the request data ([P164]-ConfgPreset) and send the request to the Master Explicit Message Server Task 5022.

As shown, at process step 5049, the Master Explicit Message Server Task 5022 can receive the new request and determine how to process it. The CIP client request message router in the Master Explicit Message Server Task 5022 can look at the request and determine how to route the request. In this non-limiting case, the request just needs to be routed to the control module (e.g., control module 3056) for processing. The Master Explicit Message Server Task 5022 can call the Build Client Request task 5028. Additionally, at process step 5050, the Build Client Request task 5028 can create a new "Passive/Active" request and send the request on to the Master subsystem to be sent to the control module (e.g., control module 3056).

In some embodiments, at process step 5051, the Master subsystem can send the response from the control module (e.g., control module 3056) to the Master Explicit Message Server Task 5022. The Master Explicit Message Server Task 5022 can receive the new request and determine how to process it. Since this non-limiting example is a CIP Client response message, the CIP client response message router in the Master Explicit Message Server Task 5022 can look at the request and determine how to route the request. In this non-limiting case, there is no post response processing that is needed, so the response can be routed back to the return mailbox.

As shown, at process step 5052, the Master Explicit Message Server Task 5022 can call the Build Client Request task 5028. Additionally, at process step 5053, the Build Client Response task 5024 can allocate memory for a response message, populate the new request and send the request to the return mailbox in the initial CIP Server Request message. In some embodiments, at process step 5054, the CIP Server Task 5006 can receive a Client Response message and determine how to process the response. The Client response message router in the CIP Server Task 5006 can look at the initial CIP request and determine how to route the NVS response. In this non-limiting case, the Identity object 5008 needs to do post response processing, so the request can be routed back to the Identity Object 5008. Process steps 5047 through 5054 can be repeated using the setting of "Custom Overload" for [P164]-ConfgPreset.

In some embodiments, at process step 5055, the Identity Object 5008 can decode the Initial Service, Instance and Attribute of the request and determine that the request was a type 1 reset. The Identity object 5008 can check the response to see if the last request was successful, and if so, the next step can be started. The next step can be to disable the software engine in the Control Module (e.g., control module 3056). The Identity Object 5008 can call the Build Client Request task 5028 to send the new request. As shown, at process step 5056, the Build Master Server Request task 5014 can create a new CIP Client Request message, populate it with the request data (e.g., Disable Dix) and send the request to the Master Explicit Message Server Task 5022.

In some embodiments, at process step 5057, the Master Explicit Message Server Task 5022 can receive the new request and determine how to process it. The CIP client request message router in the Master Explicit Message Server Task 5022 can look at the request and determine how to route the request. In this non-limiting case, the request just needs to be routed to the control module (e.g., control module 3056) for processing. The Master Explicit Message Server Task 5022 can call the Build Client Request task 5028. As shown, at process step 5058, the Build Client Request task 5028 can create a new "Passive/Active" request and send the request on to the Master subsystem to be sent to the control module (e.g., control module 3056).

In some embodiments, at process step 5059, the Master subsystem can send the response from the control module (e.g., control module 3056) to the Master Explicit Message Server Task 5022. The Master Explicit Message Server Task 5022 can receive the new request and determine how to process it. Since this non-limiting example is a CIP Client response message, the CIP client response message router in the Master Explicit Message Server Task 5022 can look at the request and determine how to route the request. In this non-limiting case, there is no post response processing that is needed, so the response can be routed back to the return mailbox. Additionally, at process step 5060, the Build Client Response task 5024 can allocate memory for a response message, populate the new request and send the request to the return mailbox in the initial CIP Server Request message.

In some embodiments, at process step 5061, the CIP Server Task 5006 can receive a Client Response message and determine how to process the response. The Client response message router in the CIP Server Task 5006 can look at the initial CIP request and determine how to route the nvs response. In this non-limiting case, the Identity object 5008 needs to do post response processing, so the request can be routed back to the Identity object 5008. As shown, at process step 5062, the CIP Server Task 5006 can process the class field of the request and route the request to the Identity object 5008.

In some embodiments, at process step 5063, the Identity object 5008 can decode the Initial Service, Instance and Attribute of the request and determine that the request was a type 1 reset. The Identity object 5008 can check the response to see if the last request was successful, and if so, the next step can be started. The next step can be to reset the software program in the Control module (e.g., control module 3056). The Identity object 5008 can call the Build Client Request task 5028 to send the new request. Additionally, at process step 5064, the Build Master Server Request task 5014 can create a new CIP Client Request message, populate it with the request data (reset DIx program) and send the request to the Master Explicit Message Server Task 5022.

As shown, at process step 5065, the Master Explicit Message Server Task 5022 can receive the new request and determine how to process it. The CIP client request message router in the Master Explicit Message Server Task 5022 can look at the request and determine how to route the request, in this case, the request can be routed to the control module (e.g., control module 3056) for processing. The Master Explicit Message Server Task 5022 can call the Build Client Request task 5028. Additionally, at process step 5066, the Build Client Request task 5028 can create a new "Passive/Active" request and send the request on to the Master subsystem to be sent to the control module (e.g., control module 3056).

In some embodiments, at process step 5067, the Master subsystem can send the response from the control module (e.g., control module 3056) to the Master Explicit Message Server Task 5022. The Master Explicit Message Server Task 5022 can receive the new request and determine how to process it. Since this is a CIP Client response message, the CIP client response message router in the Master Explicit Message Server Task 5022 can look at the request and determine how to route the request. In this non-limiting case, there is no post response processing that is needed, so the response can be routed back to the return mailbox.

As shown, at process step 5068, the Build Client Response task 5024 can allocate memory for a response message, populate the new request and send the request to the return mailbox in the initial CIP Server Request message. Additionally, at process step 5069, the CIP Server Task 5006 can receive the Client Response message and determine how to process the response. The Client response message router in the CIP Server Task 5006 can look at the initial CIP request and determine how to route the NVS response. In this non-limiting case, the Identity object 5008 needs to do post response processing, so the request can be routed back to the Identity object 5008.

In some embodiments, at process step 5070, the CIP Server Task 5006 can process the class field of the request and route the request to the Identity object 5008. Additionally, at process step 5071, the Identity object 5008 can decode the Initial Service, Instance and Attribute of the request and determine that the request was a type 1 reset. The Identity object 5008 can check the response to see if the last request was successful, and if so, the next step can be started. The next step can create an NVS Type 1 Reset Service. The Identity object 5008 can call the Build NVS Request function to send the new nvs request to the NVS Server Task. Further, at process step 5072, The NVS Server Task can receive the new nvs request and determine how to process it.

In some embodiments, at process step 5073, since this non-limiting example is an nvs Type 1 Reset request, the NVS Server task 5030 can pass control of the nvs resources to the Reset to Default State machine task 5034 by calling it. The Reset to Default State machine 5034 can now call all the CIP Objects to reset the object data to the factory defaults and store it in nvs. Notably, FIG. 5E only illustrates the call to the parameter object 5012 (which calls the parameter service functions 5018, 5020). Further, at process step 5074, the parameter "Reset to Default" service 5015 can be called, and the first operation performed by the service can be to reset all internal parameter data to defaults and write them to nvs.

In some embodiments, at process step 5075, the nvs driver 5032 can be called to write the new data to NVS. The nvs write service can run to completion and the parameter "Reset to Default" service 5015 can then continue. Additionally, at process step 5076, with the internal parameter data stored, the parameter "Reset to Default" service 5034 can work on setting the emulated device parameters which reside in the control module (e.g., control module 3056) to their defaults. This can involve reading the emulated device parameter value from the parameter table and writing the value to the Control module (e.g., control module 3056) parameter. The first emulated device parameter whose value needs to be written to the control module (e.g., control module 3056) can be read from the parameter table.

As shown, at process step 5077, the parameter "Reset to Default" service 5015 can create a new CIP Client Request message, populate it with the request data (emulated device Parameter "XXX") and send the request to the Master Explicit Message Server Task 5022. At process step 5078, the Master Explicit Message Server Task 5022 can receive the new request and determine how to process it. The CIP client request message router in the Master Explicit Message Server Task 5022 can look at the request and determine how to route the request. Since the system is in an Emulation mode in this non-limiting case, the parameter request can be routed to the Parameter Object 5026 for translation, pre and post scaling.

In some embodiments, at process step 5079, the Parameter Object 5026 can be responsible for translating emulated device parameters to actual device parameters and applying any pre control module request processing (scaling). Additionally, at process step 5080, the Parameter Object 5026 can call the Build Client Request task 5028 send the request to the control module (e.g., control module 3056). In some embodiments, at process step 5081, the Build Client Request task 5028 can create a new "Passive/Active" request and send the request on to the Master subsystem to be sent to the control module (e.g., control module 3056).

As shown, at process step 5082, the Master subsystem can send the response from the control module (e.g., control module 3056) to the Master Explicit Message Server Task 5022. The Master Explicit Message Server Task 5022 can receive the new request and determine how to process it. Since this non-limiting example is a CIP Client response message, the OP client response message router in the Master Explicit Message Server Task 5022 can look at the request and determine how to route the request. Since the system is in an emulation mode in this case, the response can be routed back to the Parameter Object 5026 for post response processing.

In some embodiments, at process step 5083, the Parameter Object 5026 can perform post response processing. In some cases where multiple actual device parameters are used to build the emulated device parameter, process steps 5026 through 5083 may be repeated multiple times to completely build the emulated device parameter. The initial CIP Client Request message can have a "sequence count" field that can be used to keep track of the number of times through the Parameter Object 5026. The Parameter Object 5026 can also apply post scaling to the control module (e.g., control module 3056) response data before routing the response back.

As shown, at process step 5084, the Build Client Response task 5024 can allocate memory for a response message, populate the new request and send the request to the return mailbox in the initial CIP Server Request message. Further, at process step 5085, a mailbox in the parameter "Reset to Default" service 5015 can receive the response from the control module (e.g., control module 3056). If no error occurred, process steps 5076 through 5085 can be repeated until all emulated device parameters have been written to the control module (e.g., control module 3056). When all parameters are completed (or an error occurs) the status can be returned to the Reset To Defaults state machine 5034.

In some embodiments, at process step 5086, when the Reset to Defaults state machine 5034 completes, the new NVS Response message can be created and populated with the status of the type 1 reset service operation and then sent back to the return mailbox in the initial NVS Request message. Additionally, at process step 5087, the CIP Server Task 5006 can receives the NVS Response message and determine how to process the response. The nvs response message router in the CIP Server Task 5006 can look at the initial CIP request and determine how to route the nvs response. In this non-limiting case, the parameter object 5026 does not need to do any post nvs write processing, so the status of nvs write can just be returned to the initial requester.

In some embodiments, at process step 5088, the CIP Server Task 5006 can process the class field of the request and route the request to the Identity object 5008. Additionally, at process step 5089, the Identity object 5008 can decode the Initial Service, Instance and Attribute of the request and determine that the request was a type 1 reset. The Identity object 5008 can check the response to see if the last request was successful, if so, the next step can be started. The next step can be to write a clear command (e.g., [P165]-ClearCommand to ClrHistoryLogs) in the Control module (e.g., control module 3056). The Identity object 5008 can call the Build Client Request task 5028 to send the new request. Further, at process step 5090, the Build Master Server Request task 5014 can create a new CIP Client Request message, populates it with the request data ([P165]-ClearCommand) and send the request to the Master Explicit Message Server Task 5022.

In some embodiments, at process step 5091, the Master Explicit Message Server Task 5022 can receive the new request and determine how to process it. The CIP client request message router in the Master Explicit Message Server Task 5022 can look at the request and determine how to route the request. In this non-limiting case, the request just needs to be routed to the control module (e.g., control module 3056) for processing. The Master Explicit Message Server Task 5022 can call the Build Client Request task 5028. Additionally, at process step 5092, the Build Client Request task 5028 can create a new "Passive/Active" request and send the request on to the Master subsystem to be sent to the control module (e.g., control module 3056).

In some embodiments, at process step 5093, the Master subsystem can send the response from the control module (e.g., control module 3056) to the Master Explicit Message Server Task 5022. The Master Explicit Message Server Task 5022 can receive the new request and determine how to process it. Since this is a CIP Client response message, the CIP client response message router in the Master Explicit Message Server Task 5022 can look at the request and determine how to route the request. In this non-limiting case, there is no post response processing that is needed, so the response can be routed back to the return mailbox. Additionally, at process step 5094, the Master Explicit Message Server Task 5022 can call the Build Client Request task 5028.

In some embodiments, at process step 5095, the Build Client Response task 5024 can allocate memory for a response message, populate the new request and send the request to the return mailbox in the initial CIP Server Request message. Additionally, at process step 5096, the CIP Server Task 5006 can receive the Client Response message and determine how to process the response. The Client response message router in the CIP Server Task 5006 can look at the initial CIP request and determine how to route the nvs response. In this non-limiting case, the Identity object 5008 needs to do post response processing, so the request can be routed back to the Identity object 5008.

In some embodiments, at process step 5097, the Identity object 5008 can decode the Initial Service, Instance and Attribute of the request and determine that the request was a type 1 reset. The Identity object 5008 can check the response to see if the last request was successful, and if so, the next step can be started. The next step can be to write a request ([P202]-OutPt0Assignment) in the Control module (e.g., control module 3056). The Identity object 5008 can call the Build Client Request task 5028 to send the new request. Additionally, at process step 5098, the Build Master Server Request task 5014 can create a new CIP Client Request message, populate it with the request data ([P202]-OutPt0Assignment), and send the request to the Master Explicit Message Server Task 5022.

In some embodiments, at process step 5099, the Master Explicit Message Server Task 5022 can receive the new request and determine how to process it. The CIP client request message router in the Master Explicit Message Server Task 5022 can look at the request and determine how to route the request. In this non-limiting case, the request just needs to be routed to the control module (e.g., control module 3056) for processing. The Master Explicit Message Server Task 5022 can call the Build Client Request task 5028. Further, at process step 5100, the Build Client Request task 5028 can create a new "Passive/Active" request and send the request on to the Master subsystem to be sent to the control module (e.g., control module 3056).

As shown, at process step 5101, the Master subsystem can send the response from the control module (e.g., control module 3056) to the Master Explicit Message Server Task 5022. The Master Explicit Message Server Task 5022 can receive the new request and determine how to process it. Since this is a CIP Client response message, the CIP client response message router in the Master Explicit Message Server Task 5022 can look at the request and determine how to route the request. In this non-limiting case, there is no post response processing that is needed, so the response can be routed back to the return mailbox. Additionally, at process step 5102, the Master Explicit Message Server Task 5022 can call the Build Client Request task 5028.

In some embodiments, at process step 5103, the Build Client Response task 5024 can allocate memory for a response message, populate the new request and send the request to the return mailbox in the initial CIP Server Request message. As shown, at process step 5104, the CIP Server Task 5006 can receive the Client Response message and determine how to process the response. The Client response message router in the CIP Server Task 5006 can look at the initial CIP request and determine how to route the nvs response. In this non-limiting case, the Identity object 5008 needs to do post response processing, so the request can be routed back to the Identity object 5008. Notably, process steps 5098 through 5104 can be repeated to set [P203]-OutPt1Assignment and [P204]-OutPt2Assignment.

As shown, at process step 5105, the Identity object 5008 can decode the Initial Service, Instance and Attribute of the request and determine that the request was a type 1 reset. The Identity object 5008 can check the response to see if the last request was successful, and if so, the next step can be started. The next step can be to send a type 0 reset to the Control module (e.g., control module 3056). The Identity object 5008 can call the Build Client Request task 5028 to send the new request. Additionally, at process step 5106, the Build Master Server Request task 5014 can create a new CIP Client Request message, populate it with the request data (type 0 reset), and send the request to the Master Explicit Message Server Task 5022.

In some embodiments, at process step 5107, the Master Explicit Message Server Task 5022 can receive the new request and determine how to process it. The CIP client request message router in the Master Explicit Message Server Task 5022 can look at the request and determine how to route the request. In this non-limiting case, the request just needs to be routed to the control module (e.g., control module 3056) for processing. The Master Explicit Message Server Task 5022 can call the Build Client Request task 5028. Further, at process step 5108, the Build Client Request task 5028 can create a new "Passive/Active" request and send the request on to the Master subsystem to be sent to the control module (e.g., control module 3056).

As shown, at process step 5109, the Master subsystem can send the response from the control module (e.g., control module 3056) to the Master Explicit Message Server Task 5022, The Master Explicit Message Server Task 5022 can receive the new request and determine how to process it. Since this is a CIP Client response message, the CIP client response message router in the Master Explicit Message Server Task 5022 can look at the request and determine how to route the request. In this non-limiting case, there is no post response processing that is needed, so the response can be routed back to the return mailbox.

In some embodiments, at process step 5110, the Master Explicit Message Server Task 5022 can call the Build Client Request task 5028. Additionally, at process step 5111, the Build Client Response task 5024 can allocate memory for a response message, populate the new request and send the request to the return mailbox in the initial CIP Server Request message. Further, at process step 5112, the CIP Server Task 5006 can receive the Client Response message and determine how to process the response. The Client response message router in the CIP Server Task 5006 can look at the initial CIP request and determine how to route the nvs response. In this non-limiting case, the Identity object 5008 needs to do post response processing, so the request can be routed back to the Identity object 5008. Since this can be the last step of the type 1 reset process, the response from the control module (e.g.; control module 3056) for the type 0 reset can be returned to the requester.

As shown, at process step 5113, the Identity object 5008 can call the build CIP Server Response function. Additionally, at process step 5114, the Build CIP Server Response task 5010 can allocate memory for a response message, populate the new request, and send the request to the return mailbox in the initial CIP Server Request message.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is to cover all modifications, equivalents, and alternatives falling within the spirit and scope of the present disclosure as defined by the following appended claims.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Finally, it is expressly contemplated that any of the processes or steps described herein may be combined, eliminated, or reordered. Accordingly, this description is meant to be taken only by way of example, and not to otherwise limit the scope of this present disclosure.

We claim:

1. A network-enabled motor control system comprising:
   a user interface that accepts user inputs; and
   a network-enabled device comprising:
      a control module comprising a memory; and
      a communication module in electrical communication with the control module and the user interface;
      the memory storing processing instructions, wherein the processing instructions, when executed by the control module, cause the control module to:
         receive, via the communication module, a user input corresponding to an emulation mode selection;
         receive, via the communication module, a communication request corresponding to an emulated device;
         modify the communication request to match an expected communication request; and
      provide the modified communication request to an associated hardware module within the control module;
      wherein the expected communication request is based on a network-enabled device type; and
      wherein a first motor control device disconnected from a communication network corresponds to the emulated device, and a replacement motor control device connected to the communication network corresponds to the network-enabled device.

2. The system of claim 1, wherein the processing instructions further cause the control module to:
   receive a response from the associated hardware module;
   modify the response to match an expected response; and
   provide, via the communication module, a modified response; and
   wherein the modified response is based on an emulated device type.

3. The system of claim 2, wherein the user interface displays is a plurality of emulated device types, each emulated device type corresponding to a motor control device.

4. The system of claim 3, wherein the user input comprises the emulated device type.

5. The system of claim 1, wherein the emulated device is obsolete.

6. The system of claim 1, wherein the processing instructions further cause the control module to:
   receive, via the communication module, a second communication request corresponding to the network-enabled device; and
   provide the second communication request to the associated hardware module within the control module.

7. The system of claim 6, wherein the processing instructions further cause the control module to:
   receive a second response from the associated hardware module; and
   provide, via the communication module, the second response.

8. A network-enabled electronic overload system comprising:
- a control module comprising a memory and providing a control voltage to a motor starter;
- a sensing module that measures operational data corresponding to the motor starter; and
- a communication module in electrical communication with the control module and communicating via a network in which the network-enabled electronic overload system is connected;
- the memory storing processing instructions, wherein the processing instructions, when executed by the control module, cause the control module to:
  - receive, via the communication module, a communication request;
  - determine that the communication request corresponds to an emulated device, the emulated device corresponding to a first motor control device disconnected from the network; and
  - in response to the determination that the communication request corresponds to the emulated device:
    - modify the communication request to match an expected communication request; and
    - provide the modified communication request to an associated hardware module within the network-enabled electronic overload system.

9. The system of claim 8, wherein the expected communication request is based on the network-enabled electronic overload system.

10. The system of claim 8, further comprising a user interface that accepts user inputs and communicates the user inputs to the communication module, wherein the user inputs correspond to a system operating mode selection.

11. The system of claim 10, wherein one of a plurality of system operating modes corresponds to a device emulation mode.

12. The system of claim 8, wherein the processing instructions further cause the control module to:
- receive, via the communication module, a second communication request corresponding to an installed device; and
- provide the second communication request to the associated hardware module within the control module.

13. The system of claim 12, wherein the processing instructions further cause the control module to:
- receive a second response from the associated hardware module; and
- provide, via the communication module, the second response.

14. A method of motor control device emulation comprising:
- connecting a replacement motor control device to a communication network, the replacement motor control device corresponding to a network-enabled motor control device;
- receiving, via the network-enabled motor control device, a communication request corresponding to an emulated motor control device;
- modifying the communication request to match an expected communication request; and
- providing the modified communication request to an associated hardware module within the network-enabled motor control device;
- wherein the expected communication request is based on the network-enabled motor control device; and
- wherein a first motor control device disconnected from the communication network corresponds to the emulated motor control device.

15. The method of claim 14, further comprising:
- receiving a response from the associated hardware module;
- modifying the response to match an expected response; and
- providing, via the network-enabled motor control device, a modified response;
- wherein the modified response is based on the emulated motor control device.

16. The method of claim 14, prior to receiving the communication request corresponding to the emulated motor control device, further comprising disconnecting the first motor control device from the communication network.

17. The method of claim 16, wherein disconnecting the first motor control device comprises disconnecting a plurality of first wires corresponding to a known wiring configuration, and wherein connecting the replacement motor control device comprises connecting a plurality of second wires corresponding to the known wiring configuration.

18. The method of claim 14, further comprising receiving a network communication indicating an emulation mode selection.

19. The method of claim 18, wherein the emulation mode selection comprises a device type corresponding to the first motor control device.

20. The method of claim 14, further comprising:
- receiving, via the network-enabled motor control device, a second communication request corresponding to an installed device; and
- providing the second communication request to an associated hardware module within the network-enabled motor control device.

* * * * *